United States Patent
Nakamura

(10) Patent No.: US 9,616,873 B2
(45) Date of Patent: Apr. 11, 2017

(54) BRAKE HYDRAULIC DEVICE FOR VEHICLE

(71) Applicant: NISSIN KOGYO CO., LTD., Ueda-shi, Nagano (JP)

(72) Inventor: Motoyasu Nakamura, Ueda (JP)

(73) Assignee: Autoliv Nissin Brake Systems Japan Co., Ltd., Nagano (JP)

(*) Notice: Subject to any disclaimer, the term of this patent is extended or adjusted under 35 U.S.C. 154(b) by 250 days.

(21) Appl. No.: 14/388,407

(22) PCT Filed: Mar. 29, 2013

(86) PCT No.: PCT/JP2013/059728
§ 371 (c)(1),
(2) Date: Sep. 26, 2014

(87) PCT Pub. No.: WO2013/147254
PCT Pub. Date: Oct. 3, 2013

(65) Prior Publication Data
US 2015/0059334 A1 Mar. 5, 2015

(30) Foreign Application Priority Data
Mar. 30, 2012 (JP) .................................. 2012-082800

(51) Int. Cl.
*B60T 15/02* (2006.01)
*B60T 13/66* (2006.01)
(Continued)

(52) U.S. Cl.
CPC .............. *B60T 15/028* (2013.01); *B60T 8/36* (2013.01); *B60T 8/368* (2013.01); *B60T 8/4081* (2013.01);
(Continued)

(58) Field of Classification Search
CPC .......... B60T 15/028; B60T 8/36; B60T 8/368; B60T 8/4081; B60T 13/66; B60T 13/662; B60T 13/686; F15B 21/08
See application file for complete search history.

(56) References Cited

U.S. PATENT DOCUMENTS

| 5,758,931 A | 6/1998 | Hio et al. |
| 5,762,318 A | 6/1998 | Staib et al. |

(Continued)

FOREIGN PATENT DOCUMENTS

| CN | 101121405 A | 2/2008 |
| CN | 101253085 A | 8/2008 |

(Continued)

OTHER PUBLICATIONS

Extended European Search Report dated Feb. 1, 2016 corresponding to European Patent Application No. 13767623.5.
(Continued)

*Primary Examiner* — Vishal Sahni
(74) *Attorney, Agent, or Firm* — Carrier Blackman & Associates, P.C.; Joseph P. Carrier; Jeffrey T. Gedeon

(57) ABSTRACT

Provided is a brake hydraulic device for a vehicle, including: a base body having a hydraulic pressure path for brake fluid formed therein; an electromagnetic valve; an electromagnetic coil; a pressure sensor; and a housing attached to the outer surface of the base body. The housing includes a peripheral wall part and an intermediate wall part partitioning a space inside the peripheral wall part into a front side and a rear side. A plurality of bus bars on the coil side to be electrically connected to the electromagnetic coil, and a plurality of bus bars on the sensor side to be electrically connected to the pressure sensor are embedded in the intermediate wall part. A hierarchy region where the bus bars on the coil side and the bus bars on the sensor side are
(Continued)

positioned in a hierarchy state with each other in the front-rear direction is provided.

10 Claims, 12 Drawing Sheets

(51) Int. Cl.
    *B60T 13/68*     (2006.01)
    *B60T 8/36*     (2006.01)
    *B60T 8/40*     (2006.01)
    *F15B 21/08*     (2006.01)

(52) U.S. Cl.
    CPC ............ *B60T 13/66* (2013.01); *B60T 13/662* (2013.01); *B60T 13/686* (2013.01); *F15B 21/08* (2013.01)

(56) References Cited

U.S. PATENT DOCUMENTS

| | | | |
|---|---|---|---|
| 5,988,772 A | 11/1999 | Hashida | |
| 7,325,563 B2 | 2/2008 | Seko | |
| 8,112,196 B2 | 2/2012 | Takayanagi | |
| 2006/0017321 A1* | 1/2006 | Tsunooka | B60T 8/368 303/119.3 |
| 2007/0108401 A1 | 5/2007 | Shibata et al. | |
| 2008/0036292 A1 | 2/2008 | Sakai et al. | |
| 2009/0030571 A1* | 1/2009 | Takayanagi | B60T 8/368 701/36 |
| 2010/0182752 A1 | 7/2010 | Weh | |
| 2012/0298897 A1* | 11/2012 | Nakamura | B60T 8/3675 251/129.15 |

FOREIGN PATENT DOCUMENTS

| | | |
|---|---|---|
| DE | 102006005185 A1 | 8/2007 |
| EP | 0735622 A | 10/1996 |
| EP | 0832801 A2 | 4/1998 |
| EP | 2019009 A2 | 1/2009 |
| JP | H08-11691 A | 1/1996 |
| JP | H08-135830 A | 5/1996 |
| JP | H09-511964 A | 12/1997 |
| JP | 2000-227174 A | 8/2000 |
| JP | 2006-117076 A | 5/2006 |
| JP | 2006-308045 A | 11/2006 |
| JP | 2007-022222 A | 2/2007 |
| JP | 2007099058 A | 4/2007 |
| JP | 2007-153305 A | 6/2007 |
| JP | 2009-030801 A | 2/2009 |
| JP | 2011-063061 A | 3/2011 |
| JP | 2011249306 A | 12/2011 |
| WO | 2007025741 A1 | 3/2007 |

OTHER PUBLICATIONS

Office Action issued Feb. 25, 2016 corresponding to Chinese Patent Application 2013800183701 with partial English translation.

* cited by examiner

BRAKE HYDRAULIC DEVICE FOR VEHICLE

TECHNICAL FIELD

The present invention relates to a brake hydraulic device for a vehicle.

BACKGROUND ART

As to a master cylinder unit (a brake hydraulic device for a vehicle) to be used in a brake system for a vehicle, there exists a device including a master cylinder to convert an input to a brake operation element into the brake hydraulic pressure, an electromagnetic valve to open and close a hydraulic pressure path disposed in a base body of the master cylinder, an electromagnetic coil to drive the electromagnetic valve, a pressure sensor to detect intensity of the hydraulic pressure of the brake fluid in the hydraulic pressure path, and a housing having a housing chamber for accommodating the electromagnetic valve, the electromagnetic coil, and the pressure sensor (for example, refer to the patent document 1).

PRIOR ART DOCUMENT

Patent Document

Patent document 1: Unexamined Japanese patent publication No. 2007-099058

SUMMARY OF THE INVENTION

Problems to be Solved by the Invention

In the inside of the housing of the above-mentioned master cylinder unit, it is required to secure a space for accommodating bus bars extending from a connector projecting on the outer surface of the housing to the electromagnetic coil or the pressure sensor as well as a space for accommodating various kinds of electric parts. Since such a housing is attached to the outer surface of the base body of the master cylinder, the housing is required to be made small.

Therefore, it is an object of the present invention to provide a brake hydraulic device for a vehicle capable of miniaturizing and lightening the housing to be attached to the outer surface of the base body.

Means for Solving the Problem

In order to solve the problem, the present invention provides a brake hydraulic device for a vehicle, including:
a base body having a hydraulic pressure path for brake fluid formed therein;
an electromagnetic valve which opens and closes the hydraulic pressure path;
an electromagnetic coil which drives the electromagnetic valve;
a pressure sensor which detects intensity of the hydraulic pressure of the brake fluid in the hydraulic pressure path; and
a housing attached to an outer surface of the base body and having a housing chamber for accommodating the electromagnetic valve, the electromagnetic coil, and the pressure sensor.
The housing includes a peripheral wall part having openings formed on a front side and a rear side thereof and an intermediate wall part partitioning a space inside the peripheral wall part into a front side and a rear side, and the housing chamber is provided on the rear side of the intermediate wall part.

A plurality of bus bars on the coil side to be electrically connected to the electromagnetic coil, and a plurality of bus bars on the sensor side to be electrically connected to the pressure sensor are embedded in the intermediate wall part, and a region in which the bus bars on the coil side and the bus bars on the sensor side are positioned in a hierarchy state with each other in a front-rear direction, is provided.

According to this configuration, since there is provided a region in which the bus bars on the coil side and the bus bars on the sensor side are positioned in a hierarchy state with each other in the front-rear direction in the intermediate wall part, different kinds of bus bars can be densely disposed. Therefore, a space for accommodating bus bars can be miniaturized, the design flexibility for disposing the bus bars can be enhanced.

And it is preferable that at least one of two hierarchy regions is provided in the intermediate wall part to densely dispose the bus bars. One hierarchy region is a hierarchy region on the coil side in which the respective bus bars on the coil side are positioned in a hierarchy state in the front-rear direction, and the other hierarchy region is a hierarchy region on the sensor side in which the respective bus bars on the sensor side are positioned in a hierarchy state in the front-rear direction.

Furthermore, in a case where a hierarchy region on the coil side in which the respective bus bars on the coil side are positioned in a hierarchy state in the front-rear direction, and a hierarchy region on the sensor side in which the respective bus bars on the sensor side are positioned in a hierarchy state in the front-rear direction, are provided in the intermediate wall part, it is preferable that the hierarchy region on the coil side and the hierarchy region on the sensor side are shifted from each other in a wide direction of the intermediate wall part to prevent the hierarchy regions of bus bars from becoming thick in the front-rear direction.

In a case where at least either respective bus bars of the respective bus bars on the coil side and the respective bus bars on the sensor side are positioned in a hierarchy state in the front-rear direction while being shifted in a wide direction of the intermediate wall part, the respective bus bars can be held in the front-rear direction with holding pins or the like even in a region where the respective bus bars are positioned in a hierarchy state with each other or one another, so that the bus bars can be accurately positioned when the intermediate wall part is molded.

In a case where three of the electromagnetic valves are accommodated in the housing chamber in the brake hydraulic device for a vehicle mentioned above, it is preferable that the three electromagnetic valves are disposed so that an isosceles triangle is formed of line segments each of which connects the axis positions of the three electromagnetic valves on a wall surface of the intermediate wall part. According to this configuration, the three electromagnetic valves and the electromagnetic coils can be compactly accommodated in the housing.

Note that, in a case where the openings of the peripheral wall part are formed to be quadrangular, the electromagnetic valves can be disposed in three corner portions of the four corner portions of the peripheral wall part, so that a space in the housing can be effectively utilized.

Furthermore, it is preferable that the pressure sensor is positioned on a line to divide the apex angle of the isosceles triangle formed of the line segments each of which connects the axis positions of the three electromagnetic valves, into two equal angles.

Furthermore, it is preferable that the pressure sensor is positioned outside the region surrounded by the line segments each of which connects the axis positions of the three electromagnetic valves on the wall surface of the intermediate wall part.

Moreover, in a case where two pressure sensors are accommodated in the housing chamber, it is preferable that one of the two pressure sensors is positioned inside a region surrounded by the line segments each of which connects the axis positions of the three electromagnetic valves and an axis position of the other of the two pressure sensors on the wall surface of the intermediate wall part.

According to these respective configurations, the three electromagnetic valves and a pressure sensor or pressure sensors can be disposed in the housing in a compact and good balance state.

Furthermore, a necessary space for accommodating bus bars is small and the design flexibility for disposing the bus bars is large, according to the present invention, so the space to dispose the bus bars can be secured in the housing even if electromagnetic valves, electromagnetic coils, and a pressure sensor or pressure sensors are disposed in the housing in a compact state.

In a case where at least one electromagnetic valve of the three electromagnetic valves is attached to the intermediate wall part while being shifted from the other electromagnetic valves in a front-rear direction, in the brake hydraulic device for a vehicle mentioned above, the design flexibility of the layout of the hydraulic pressure path to be formed in the base body can be enhanced.

Effect of the Invention

According to the brake hydraulic device for a vehicle of the present invention, since a necessary space for accommodating bus bars in the housing can be miniaturized and the design flexibility for disposing the bus bars can be enhanced, the housing can be miniaturized and lightened.

MODE FOR CARRYING OUT THE INVENTION

An embodiment of the present invention will be described in detail appropriately with reference to Figures.

In the present embodiment, a case where a master cylinder unit being a brake hydraulic device for a vehicle of the present invention is applied to a brake system A for a vehicle (vehicle-brake system A) shown in FIG. 1 will be explained as an example.

Figure 1:
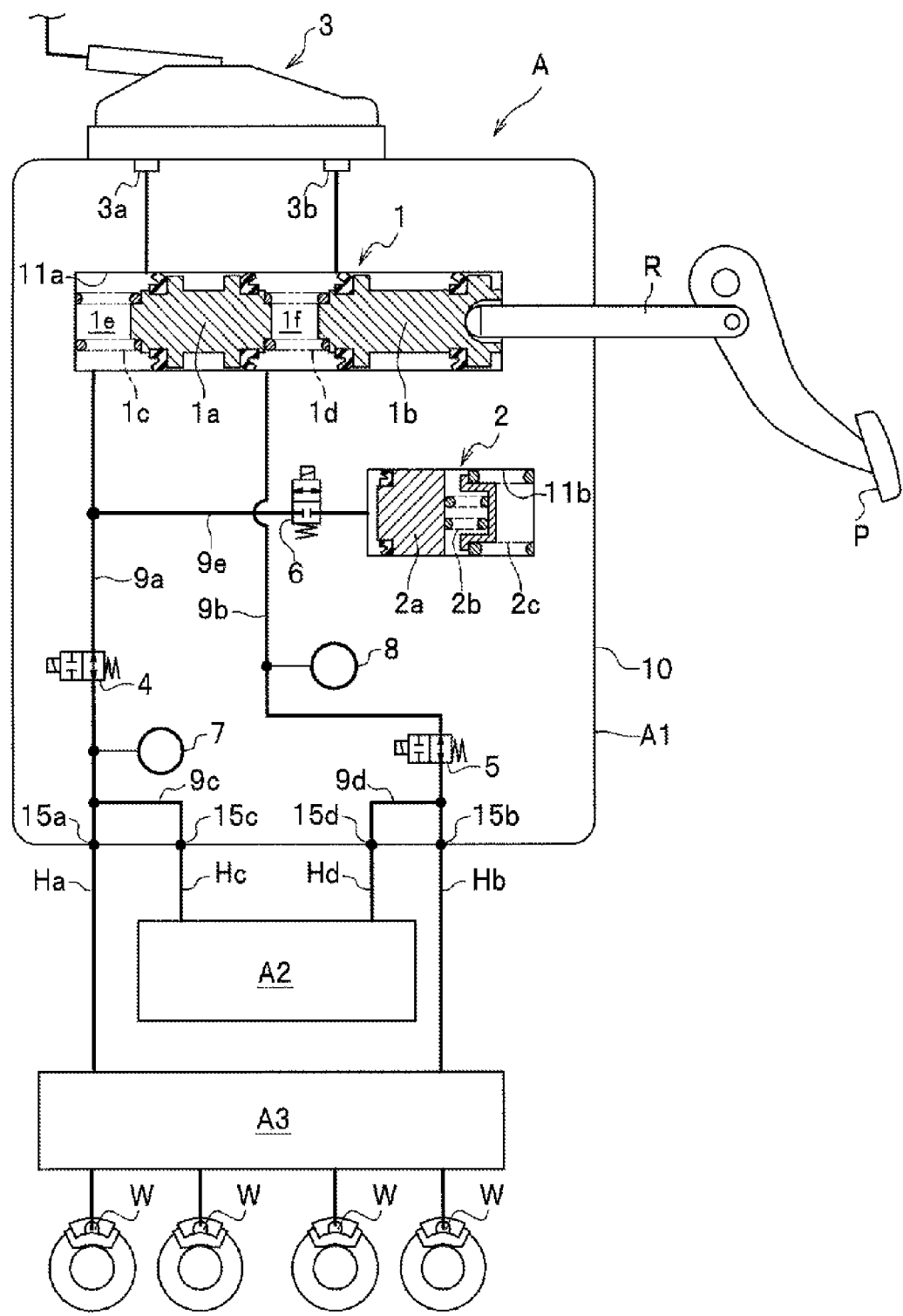
FIG. 1 is a whole structure view showing a brake system for a vehicle using a master cylinder unit of the present embodiment.

The vehicle-brake system A shown in FIG. 1 includes both of a By Wire-type brake system which operates when a power plant (engine, electric motor, or the like) starts, and a hydraulic brake system which operates in emergency or when the power plant stops or in the like.

The vehicle-brake system A is provided with a master cylinder unit A1 to generate the brake hydraulic pressure in accordance with the stepping force to step down a brake pedal P (brake operation element), a motor cylinder unit A2 to generate the brake hydraulic pressure with the use of an electric motor (not shown), and a hydraulic pressure control unit A3 to support the stabilization of the movement of a vehicle.

The master cylinder unit A1, the motor cylinder unit A2, and the hydraulic pressure control unit A3 are constituted as respective units, and connected to one another through external pipes.

The vehicle-brake system A can be also installed in a hybrid vehicle using also an electric motor, in a fuel cell electric vehicle and an electric vehicle using only an electric motor as a power source, and in the like, as well as in a vehicle using a power source of only an engine (internal combustion engine).

The master cylinder unit A1 has a tandem-type master cylinder 1, a stroke simulator 2, a reservoir 3, shutoff valves 4, 5, 6, pressure sensors 7, 8, main hydraulic pressure paths 9a, 9b, communication hydraulic pressure paths 9c, 9d, and a branch hydraulic pressure path 9e. The aforementioned parts are installed to a base body 10, and the respective hydraulic pressure paths 9a to 9e are formed in the base body 10.

The master cylinder 1 is one to convert the stepping force for the brake pedal P into the brake hydraulic pressure, and has a first piston $1a$ disposed on a bottom surface side of a first cylindrical bore $11a$, a second piston $1b$ connected to a push rod R, a first elastic member $1c$ accommodated in a first pressure chamber $1e$ formed between the bottom surface of the first cylindrical bore $11a$ and the first piston $1a$, and a second elastic member $1d$ accommodated in a second pressure chamber $1f$ formed between both of the pistons $1a$, $1b$.

The second piston $1b$ is connected to the brake pedal P through the push rod R. The both pistons $1a$, $1b$ slide in the first cylindrical bore $11a$ in accordance with the stepping force for the brake pedal P, so that those pressurize brake fluid in the both pressure chamber $1e$, $1f$. The main hydraulic pressure paths $9a$, $9b$ communicate with the both pressure chambers $1e$, $1f$, respectively.

The stroke simulator 2 is one to generate a pseudo-operational reaction force for the brake pedal P, and has a piston 2a capable of sliding in a second cylindrical bore 11b, and two elastic members 2b, 2c urging the piston 2a toward a bottom surface side.

The stroke simulator 2 is communicated with the first pressure chamber 1e of the master cylinder 1 through the branch hydraulic pressure path 9e and the main hydraulic pressure path 9a, so that the piston 2a operates in accordance with the brake hydraulic pressure generated in the first pressure chamber 1e.

The reservoir 3 is a vessel to reserve the brake fluid therein, and has fluid-supply ports 3a, 3b to be communicated with the master cylinder 1, and a hose extending from a main reservoir (not shown) is connected thereto.

The main hydraulic pressure paths 9a, 9b are hydraulic pressure paths starting from the master cylinder 1. Tubular members Ha, Hb which reach the hydraulic pressure control unit A3 are connected to output ports 15a, 15b positioned at the terminal points of the main hydraulic pressure paths 9a, 9b.

The communication hydraulic pressure paths 9c, 9d are hydraulic pressure paths which reach the main hydraulic pressure paths 9a, 9b from input ports 15c, 15d. Tubular members Hc, Hd which reach the motor cylinder unit A2 are connected to the input ports 15c, 15d.

The branch hydraulic pressure path 9e is a hydraulic pressure path which branches from the main hydraulic pressure path 9a communicating with the first pressure chamber 1e and reaches the stroke simulator 2.

Figure 4:
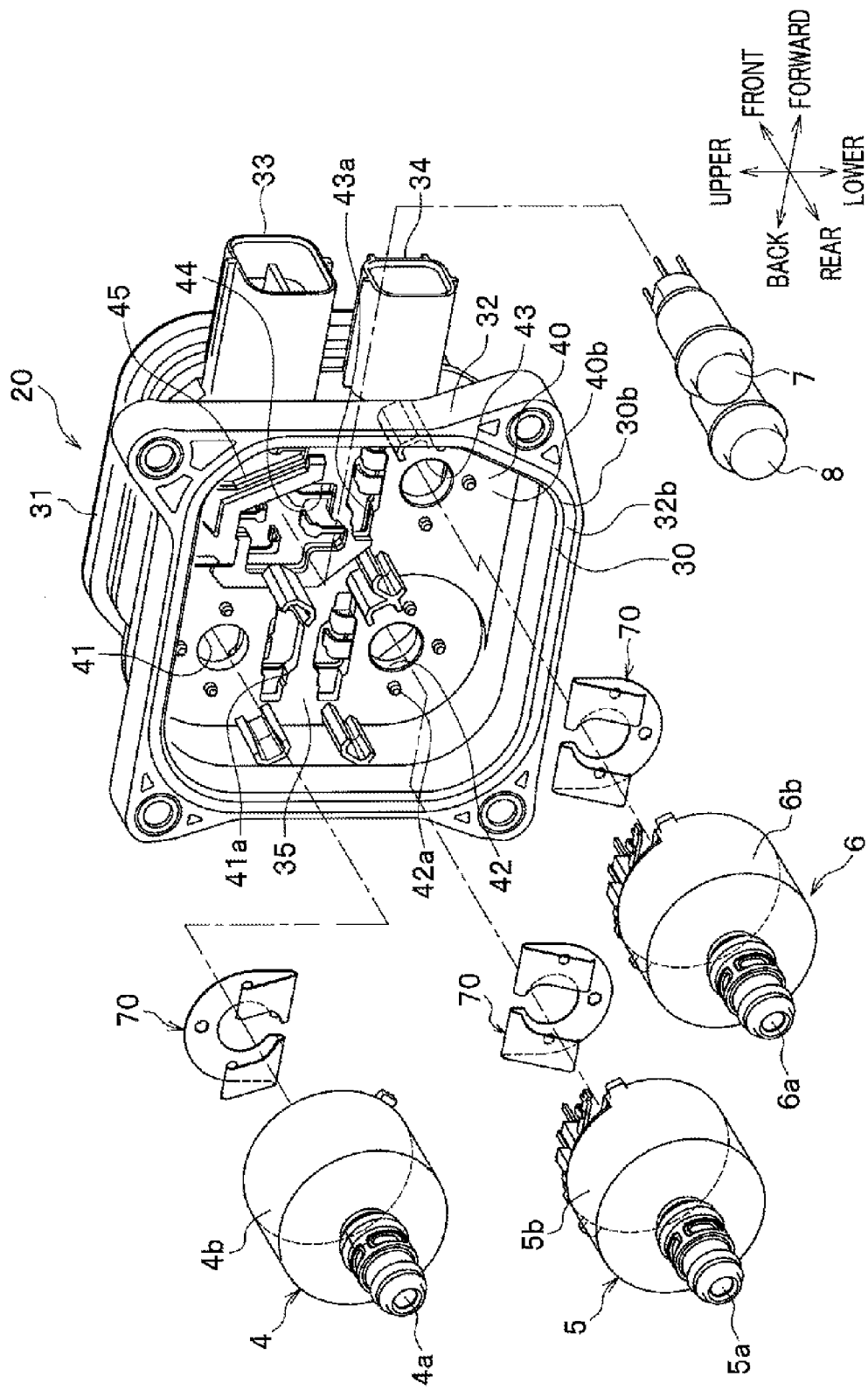
FIG. 4 is an exploded perspective view showing the housing, shutoff valves and pressure sensors of the present embodiment.

The first shutoff valve 4 and the second shutoff valve 5 are normally open type shutoff valves to open or close the main hydraulic pressure paths 9a, 9b. The first shutoff valve 4 and the second shutoff valve 5, as shown in FIG. 4, have electromagnetic valves 4a, 5a, and electromagnetic coils 4b, 5b wound on the outside of the electromagnetic valves 4a, 5a. And when current is supplied to the electromagnetic coils 4b, 5b so that the electromagnetic coils 4b, 5b are excited, the electromagnetic valves 4a, 5a are closed by moving of movable cores in the electromagnetic valves 4a, 5a.

As shown in FIG. 1, the first shutoff valve 4 opens or closes the main hydraulic pressure path 9a in the path between the crossing of the main hydraulic pressure path 9a and the branch hydraulic pressure path 9e and the crossing of the main hydraulic pressure path 9a and the communication hydraulic pressure path 9c. And the second shutoff valve 5 opens or closes the main hydraulic pressure path 9b on the upstream side of the crossing of the main hydraulic pressure path 9b and the communication hydraulic pressure path 9d.

The third shutoff valve 6 is a normally closed type shutoff valve to open or close the branch hydraulic pressure path 9e. The third shutoff valve 6 has an electromagnetic valve 6a and an electromagnetic coil 6b wound on the outside of the electromagnetic valve 6a as shown in FIG. 4. And when current is supplied to the electromagnetic coil 6b so that the electromagnetic coil 6b is excited, the electromagnetic valve 6a is opened by moving of a movable core in the electromagnetic valve 6a.

Pressure sensors 7, 8 shown in FIG. 1 are ones to detect the intensity of the brake hydraulic pressure, are attached in sensor attachment holes (not shown) communicating with the main hydraulic pressure paths 9a, 9b.

The first pressure sensor 7 is disposed on the downstream side of the first shutoff valve 4, and detects the brake hydraulic pressure generated in the motor cylinder unit A2 when the first shutoff valve 4 is in the closed state (when the main hydraulic pressure path 9a is in the shut state).

The second pressure sensor 8 is disposed on the upstream side of the second shutoff valve 5, and detects the brake hydraulic pressure generated in the master cylinder 1 when the second shutoff valve 5 is in the closed state (when the main hydraulic pressure path 9b is in the shut state).

Data detected by the pressure sensors 7, 8 are output to an electronic control unit not shown.

The master cylinder unit A1 is communicated with the hydraulic pressure control unit A3 through the tubular members Ha, Hb. Therefore, the brake hydraulic pressures generated in the master cylinder 1 when the first shutoff valve 4 and the second shutoff valve 5 are in the open state, are input into the hydraulic pressure control unit A3 through the main hydraulic pressure paths 9a, 9b and the tubular members Ha, Hb.

The motor cylinder unit A2 has a slave piston to slide in a slave cylinder, an actuator mechanism having an electric motor and a driving-force-transmission part, and a reservoir to reserve the brake fluid in the slave cylinder, which are not shown.

The electric motor operates in accordance with signals from the electronic control unit not shown. The driving-force-transmission part transmits rotational power of the electric motor to the slave piston after converting the rotational power into forward-backward motion. The slave piston slides in the slave cylinder in accordance with the received driving force of the electric motor to pressurize the brake fluid in the slave cylinder.

The brake hydraulic pressure generated in the motor cylinder unit A2 is input into the master cylinder unit A1 through the tubular members Hc, Hd, and input into the hydraulic pressure control unit A3 through the communication hydraulic pressure paths 9c, 9d and the tubular members Ha, Hb. A hose extending from the main reservoir (not shown) is connected to the reservoir.

The hydraulic pressure control unit A3 includes a constitution so as to execute an antilock brake control (ABS control) to control slips of wheels, a skid control to stabilize movement of a vehicle, a traction control, and the like, and is connected to wheel cylinders W through tubular members.

Furthermore, the hydraulic pressure control unit A3 has a hydraulic pressure unit having an electromagnetic valve, a pump, and the like, an electric motor to drive the pump, an electronic control unit to control the electromagnetic valve, the motor, and the like, which parts are not shown.

An outline of the operation of the vehicle-brake system. A will be explained in the following.

In a normal time when the vehicle-brake system A normally operates, the first shutoff valve 4 and the second shutoff valve 5 are closed, and the third shutoff valve 6 is opened.

When the brake pedal P is operated in this state, brake hydraulic pressure generated in the master cylinder 1 is not transmitted to the wheel cylinders W, but is transmitted to the stroke simulator 2, so that a stroke of the brake pedal P is allowed in accordance with displacement of the piston 2a and the pseudo-operational reaction force is applied to the brake pedal P.

When depression of the brake pedal P is detected by a stroke sensor or the like not shown, the electric motor of the motor cylinder unit A2 is driven, so that the brake fluid in the slave cylinder is pressurized in accordance with displacement of the slave piston.

The electronic control unit not shown compares a brake hydraulic pressure output out of the motor cylinder unit A2

(a brake hydraulic pressure detected by the pressure sensor 7) with a brake hydraulic pressure output out of the master cylinder 1 (a brake hydraulic pressure detected by the pressure sensor 8) to control a rotational speed and the like of the electric motor based on the result of the comparison.

The brake hydraulic pressure generated in the motor cylinder unit A2 is transmitted to each wheel cylinder W through the hydraulic pressure control unit A3, so that the braking force is applied to each wheel by the operation of each wheel cylinder W.

Note that, when the motor cylinder unit A2 does not operate (for example, when electric power is not got, in emergency, or the like), both of the first shutoff valve 4 and the second shutoff valve 5 become open, and the third shutoff valve 6 becomes closed, so that the brake hydraulic pressure generated in the master cylinder 1 is transmitted to the wheel cylinders W.

Next, the specific structure of the master cylinder unit A1 will be explained.

Figure 2A:
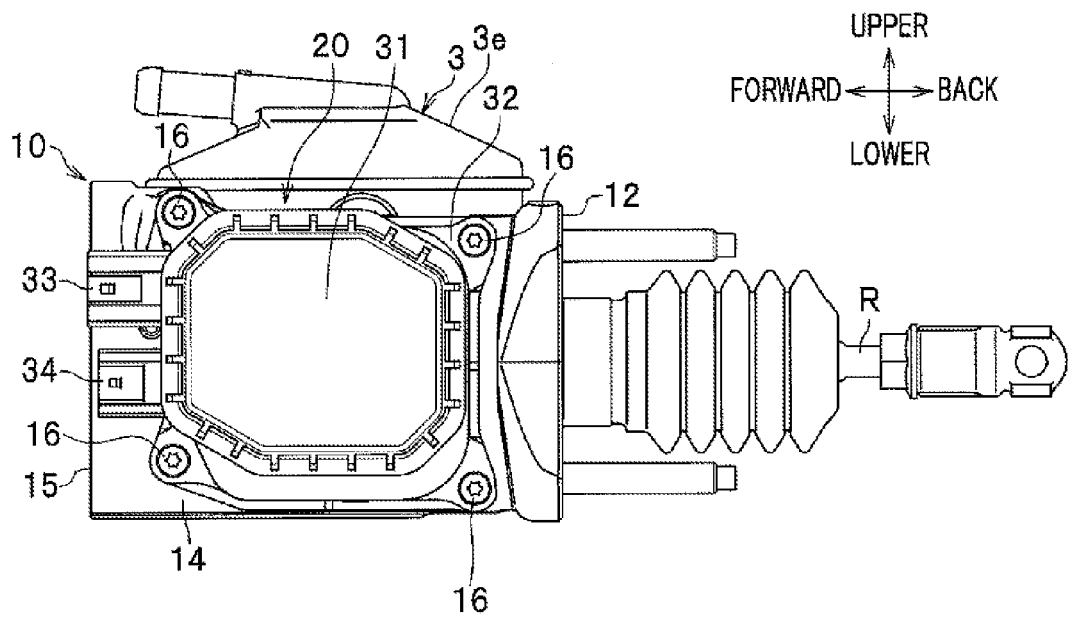
FIG. 2A is a side view of the master cylinder unit of the present embodiment.
Figure 2B:
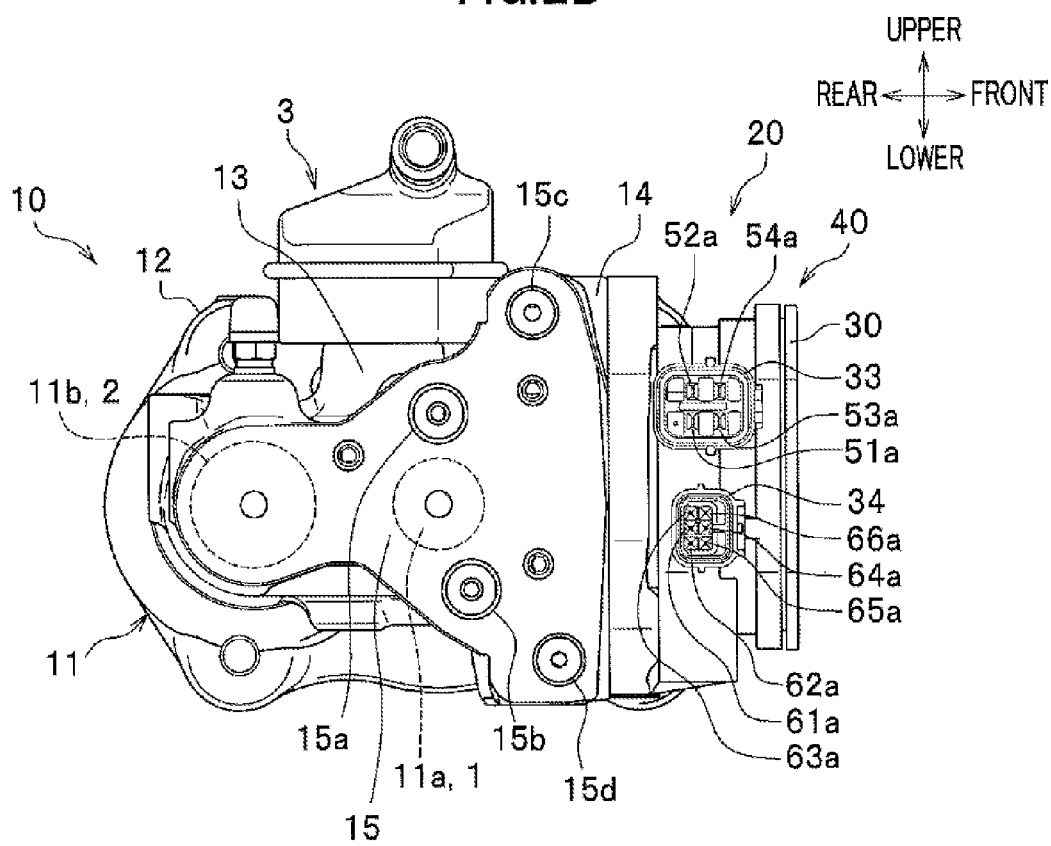
FIG. 2B is a view of the master cylinder unit of the present embodiment viewed from the forward side.

The master cylinder unit A1 of the present embodiment is formed by installing aforementioned various parts in the inside or the outer side portion of the base body 10 shown in FIGS. 2A and 2B, and by covering parts to electrically operate (shutoff valves 4, 5, 6 and pressure sensors 7, 8) with a housing 20.

The base body 10 is a casting of aluminum alloy, and has a cylinder part 11, a vehicle-body-fixing part 12, a reservoir-attachment part 13, a housing-attachment part 14, and a pipe-connection part 15. And bores (not shown) being the main hydraulic pressure path 9a, 9b, the branch hydraulic pressure path 9e (refer to FIG. 1), and the like are formed in the inside of the base body 10.

The first cylindrical bore 11a of the master cylinder 1 and the second cylindrical bore 11b of the stroke simulator 2 are formed in the cylinder part 11.

Parts constituting the master cylinder 1 are inserted in the first cylindrical bore 11a, and parts constituting the stroke simulator 2 are inserted in the second cylindrical bore 11b.

The vehicle-body-fixing part 12 is a part to be fixed to a vehicle body like a toe board, and is formed on the back face portion of the base body 10.

The reservoir-attachment part 13 is a seat part to attach the reservoir 3 thereto, and is formed on the upper face portion of the base body 10. And two reservoir union ports (not shown) are formed in the reservoir-attachment part 13.

The pipe-connection part 15 is a seat part to attach pipes thereto, and is formed on the forward face portion of the base body 10. Two output ports 15a, 15b and two input ports 15c, 15d are formed in the pipe-connection part 15.

The tubular members Ha, Hb extending to the hydraulic pressure control unit A3 (refer to FIG. 1) are connected to the output ports 15a, 15b, and tubular members Hc, Hd extending to the motor cylinder unit A2 (refer to FIG. 1) are connected to the input ports 15c, 15d.

The housing-attachment part 14 is a seat part to attach the housing 20 thereto, and is formed on the side face portion of the base body 10. The housing-attachment part 14 presents a form of flange.

An upper end portion and a lower end portion of the housing-attachment part 14 overhang the top and the bottom of the cylinder part 11, respectively, and are formed with screw holes.

Three valve-attachment holes and two sensor-attachment holes are formed in the housing-attachment part 14, which holes are not shown. The shutoff valves 4, 5, 6 are attached to the three valve-attachment holes, and the pressure sensors 7, 8 are attached to the two sensor-attachment holes (refer to FIG. 5).

The housing 20 is a plastic box body. As shown in FIG. 4, the housing 20 has a peripheral wall part 30 opened on the front side and the rear side, a cover 31 (refer to FIG. 5) to close an opening 30a on the front side of the peripheral wall part 30, a flange part 32 projecting from an outer surrounding edge part for an opening 30b on the rear side of the peripheral wall part 30, two connectors 33, 34 disposed in projecting state on the peripheral wall part 30, an intermediate wall part 40 disposed inside the peripheral wall part 30, and a group 50 of bus bars on the coil side and a group 60 of bus bars on the sensor side embedded in the intermediate wall part 40 (refer to FIG. 8).

The peripheral wall part 30 is apart to surround parts attached to the housing-attachment part 14 (refer to FIG. 5) (the shutoff valves 4, 5, 6, and the pressure sensors 7, 8), and the contour thereof is formed to be schematically quadrangular.

Figure 5:
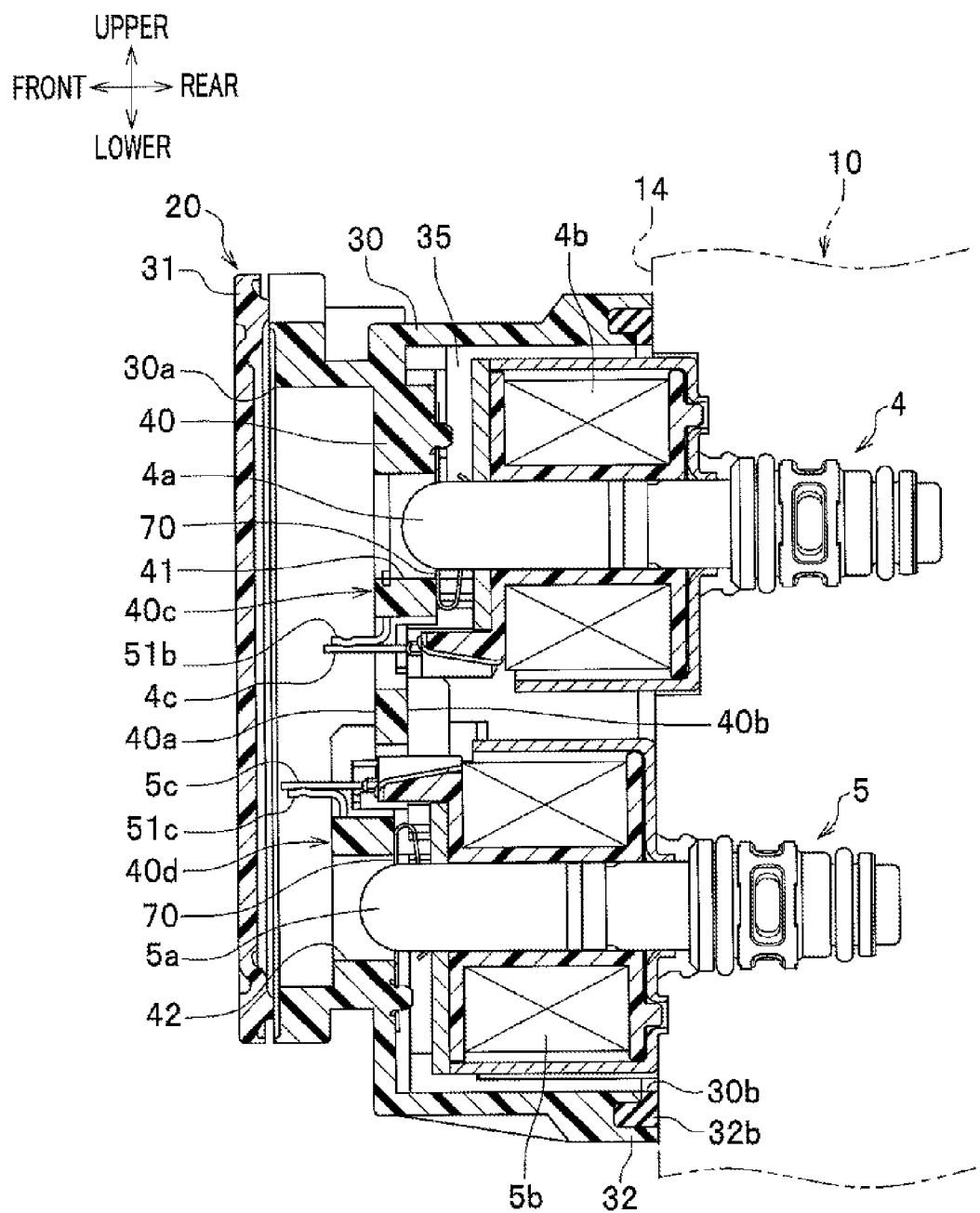
FIG. 5 is a sectional view of the housing and the shutoff valves taken along the line A-A shown in FIG. 3.

As shown in FIG. 5, the cover 31 is a cover to tightly close the opening 30a on the front side of the peripheral wall part 30, and is fixed on an end surface on the front side of the peripheral wall part 30 by means of adhesion or welding.

The flange part 32 is a part to be crimped (or press-bonded) to the housing-attachment part 14. Bolt-insertion holes 32a (refer to FIG. 3) are formed in four corner portions of the flange part 32 correspondingly to the screw holes of the housing-attachment part 14. Bolts 16 inserted in the bolt-insertion holes 32a are screwed into the screw holes of the housing-attachment part 14, so that the housing 20 is fixed to the housing-attachment part 14.

Furthermore, an endless seal member 32b is set on an end surface on the rear side of the flange part 32 to tightly contact with the housing-attachment part 14.

As shown in FIG. 4, the connectors 33, 34 have tubular forms with rectangular cross sections, and project from a forward surface of the peripheral wall part 30 with an adequate distance in the upper-lower direction.

The connector 33 on the coil side disposed on the upper side is a connector to be connected with cables for supplying currents to the electromagnetic coils 4b, 5b, 6b.

The connector 34 on the sensor side disposed on the lower side is a connector to be connected with cables for sending the detected signals output from the pressure sensors 7, 8 to the electric control unit not shown.

The intermediate wall part 40 is a partition wall for partitioning a space inside the peripheral wall part 30 into the front side and the rear side, as shown in FIG. 5. The intermediate wall part 40 is formed to be substantially quadrangular (refer to FIG. 3), and a corner portion 40d on the back and lower side is offset toward the front side than the other portions. That is, the corner portion 40d on the back and lower side of the intermediate wall part 40 is, on the front surface 40a, projected toward the front side than the other portions, and on the rear surface 40b, recessed toward the front side than the other portions.

A housing chamber 35 which accommodates the three shutoff valves 4, 5, 6 and the two pressure sensors 7, 8 is formed on the rear side of the intermediate wall part 40 as shown in FIG. 4.

Figure 3:
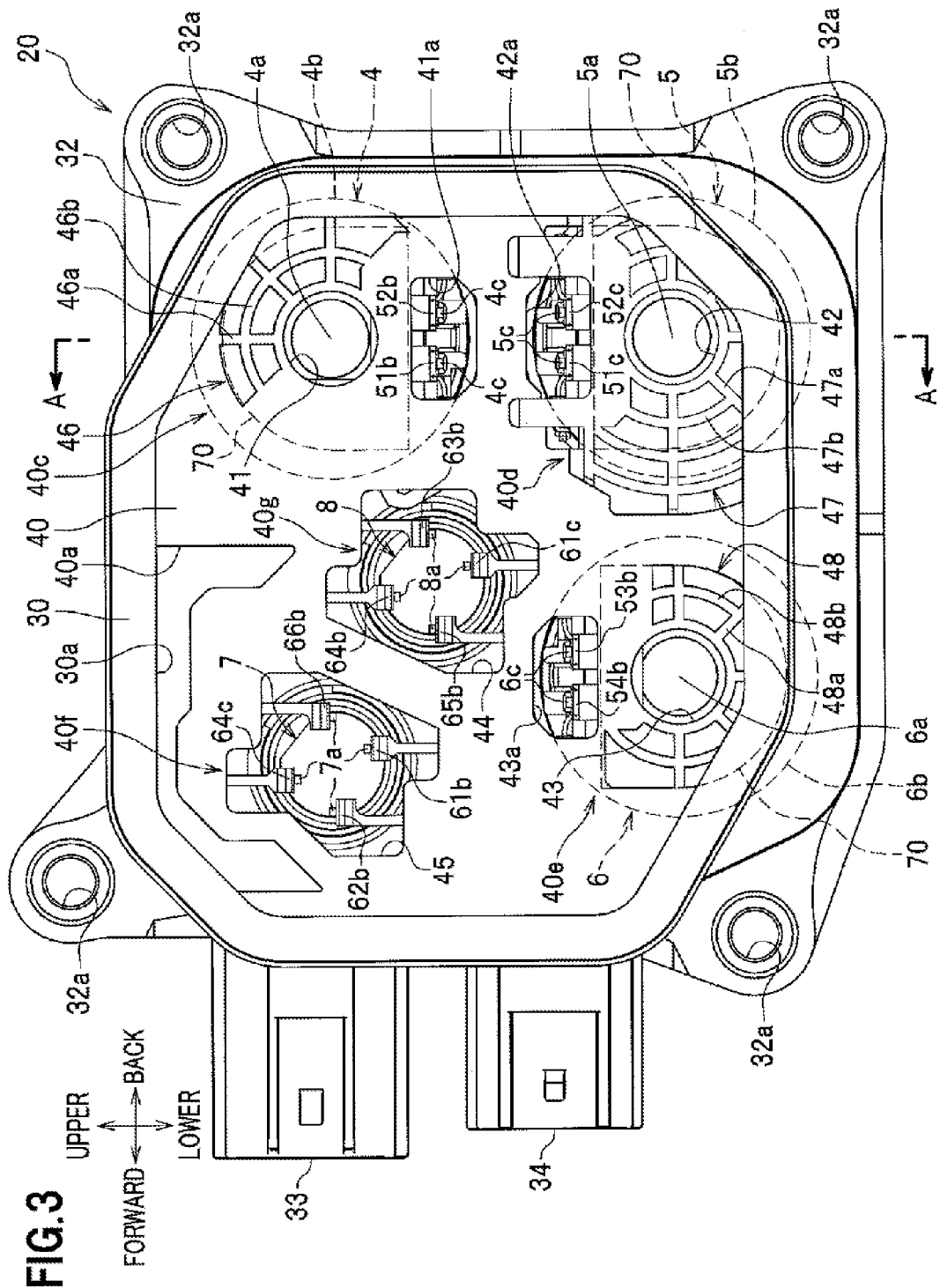
FIG. 3 is a side view of the inside of a housing of the present embodiment viewed from the front side.

Three electromagnetic-valve-insertion holes 41, 42, 43, three openings 41a, 42a, 43a for coils, and two openings 44, 45 for sensors are formed through the intermediate wall part 40 in the front-rear direction as shown in FIG. 3.

The first electromagnetic-valve-insertion hole 41 is a tubular hole formed in a corner portion 40c on the back and upper side of the intermediate wall part 40. An upper end portion of the electromagnetic valve 4a of the first shutoff valve 4 is inserted into the first electromagnetic-valve-insertion hole 41 (refer to FIG. 5).

The first opening 41a for coil is formed under the first electromagnetic-valve-insertion hole 41, into which opening a connection terminal 4c of the electromagnetic coil 4b of the first shutoff valve 4 is inserted.

The second electromagnetic-valve-insertion hole 42 is a tubular hole formed in the corner portion 40d on the back and lower side of the intermediate wall part 40. An upper end portion of the electromagnetic valve 5a of the second shutoff valve 5 is inserted into the second electromagnetic-valve-insertion hole 42 (refer to FIG. 5).

The second opening 42a for coil is formed over the second electromagnetic-valve-insertion hole 42, into which opening a connection terminal 5c of the electromagnetic coil 5b of the second shutoff valve 5 is inserted.

The third electromagnetic-valve-insertion hole 43 is a tubular hole formed in a corner portion 40e on the forward and lower side of the intermediate wall part 40. An upper end portion of the electromagnetic valve 6a of the third shutoff valve 6 is inserted into the third electromagnetic-valve-insertion hole 43.

The third opening 43a for coil is formed over the third electromagnetic-valve-insertion hole 43, into which opening a connection terminal 6c of the electromagnetic coil 6b of the third shutoff valve 6 is inserted.

Figure 6:
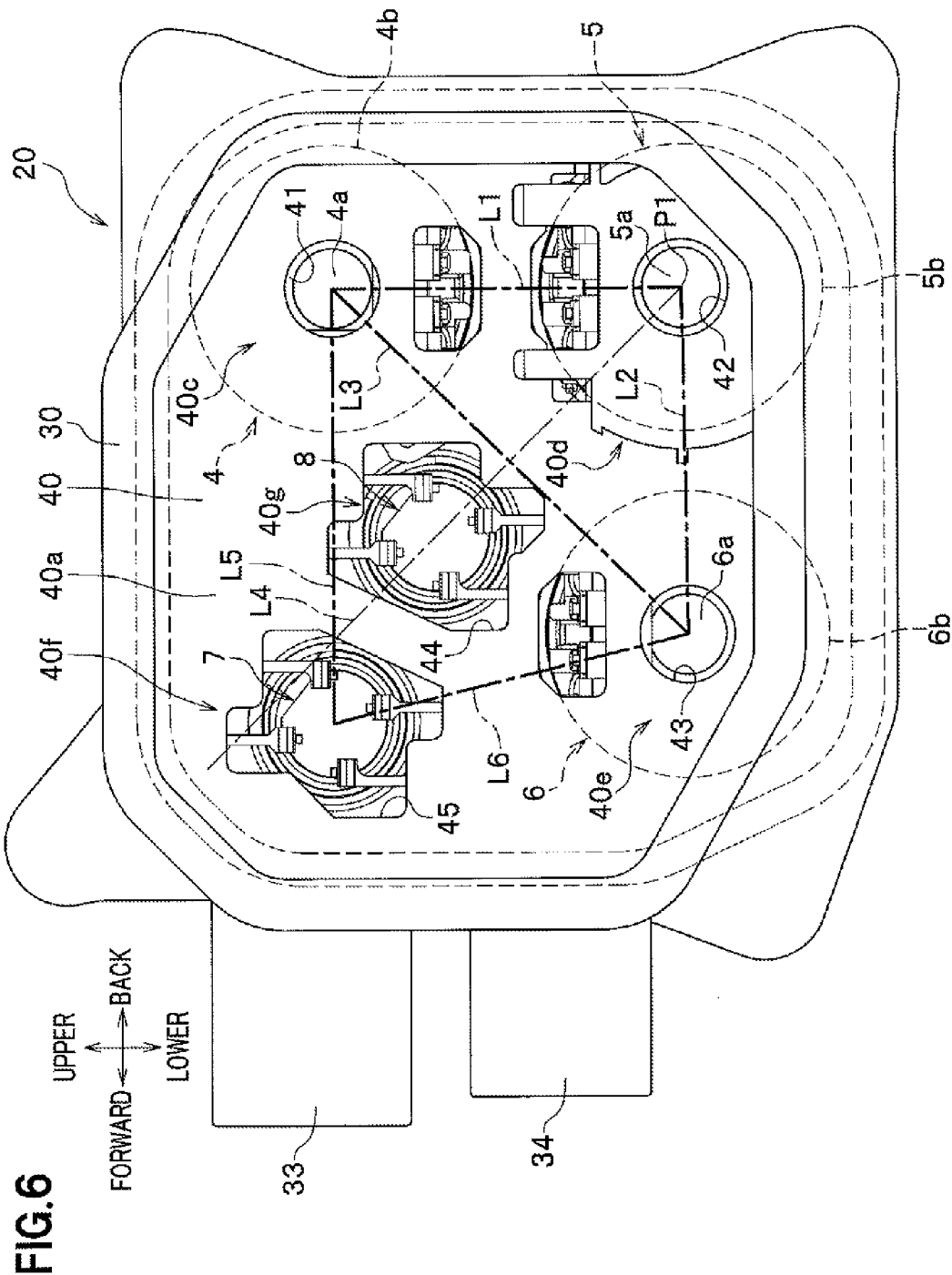
FIG. 6 is a view showing the relation of the positions of the electromagnetic valves and the pressure sensors of the present embodiment.

In the present embodiment, on the front surface 40a of the intermediate wall part 40, a line segment L1 connecting an axis position of the electromagnetic valve 4a of the first shutoff valve 4 and an axis position of the electromagnetic valve 5a of the second shutoff valve 5 is directed in the upper-lower direction along a back edge portion of the peripheral wall part 30, as shown in FIG. 6.

Next, on the front surface 40a of the intermediate wall part 40, a line segment L2 connecting an axis position of the electromagnetic valve 5a of the second shutoff valve 5 and an axis position of the electromagnetic valve 6a of the third shutoff valve 6 is directed in the forward-back direction along a lower edge portion of the peripheral wall part 30.

Furthermore, the line segments L1 and L2 are orthogonally crossed to each other at the axis position of the electromagnetic valve 5a of the second shutoff valve 5, and have the same length.

Thus, the three electromagnetic-valve-insertion holes 41, 42, 43 are disposed so that an isosceles triangle having an apex angle P1 at the axis position of the electromagnetic valve 5a of the second shutoff valve 5 is formed of the line segments L1, L2, L3 connecting the axis positions of the three electromagnetic valves 4a, 5a, 6a on the front surface 40a of the intermediate wall part 40.

Furthermore, distances among the three electromagnetic-valve-insertion holes 41, 42, 43 are set so that adjacent electromagnetic coils among the electromagnetic coils 4b, 5b, 6b are positioned with a prescribed distance when the shutoff valves 4, 5, 6 are inserted into the three electromagnetic-valve-insertion holes 41, 42, 43, respectively.

The first opening 44 for sensor is open in the central portion 40g of the intermediate wall part 40 as shown in FIG. 3. The second pressure sensor 8 is disposed on the rear side of a schematically central portion of the first opening 44 for sensor, so that four connection terminals 8a equipped on the second pressure sensor 8 are inserted into the first opening 44 for sensor.

The second opening 45 for sensor is open in the forward and upper region 40f of the intermediate wall part 40. The first pressure sensor 7 is disposed on the rear side of a schematically central portion of the second opening 45 for sensor, so that four connection terminals 7a equipped on the first pressure sensor 7 are inserted into the second opening 45 for sensor.

In the present embodiment, on the front surface 40a of the intermediate wall part 40, the first opening 44 for sensor and the second opening 45 for sensor are disposed so that the second pressure sensor 8 is positioned on the line L4 which divides the apex angle P1 of the isosceles triangle into two equal angles on the front surface 40a of the intermediate wall part 40, as shown in FIG. 6, which triangle is formed of the line segments L1, L2, L3 connecting the axis positions of the three electromagnetic valves 4a, 5a, 6a.

And the first opening 44 for sensor is disposed so that the second pressure sensor 8 is positioned outside the region of the isosceles triangle surrounded by the line segments L1, L2, L3 on the front surface 40a of the intermediate wall part 40.

Furthermore, the first opening 44 for sensor and the second opening 45 for sensor are disposed so that the second pressure sensor 8 is positioned within a region in a quadrangle surrounded by (the) line segments L1, L2, L5, L6 connecting the axis positions of the three electromagnetic valves 4a, 4b, 4c and the axis position of the first pressure sensor 7 on the front surface 40a of the intermediate wall part 40.

Figure 7:
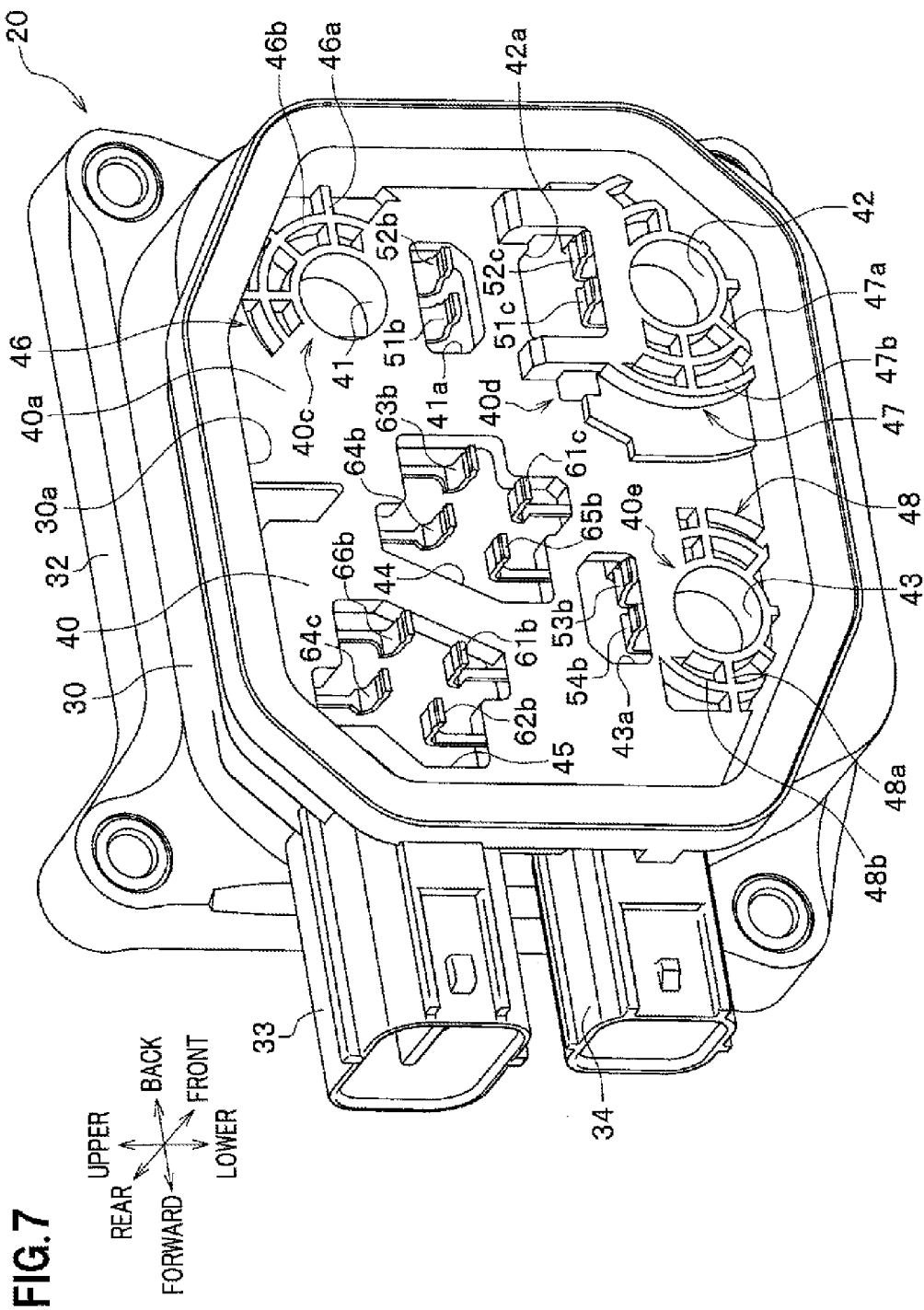
FIG. 7 is a perspective view of the inside of the housing of the present embodiment viewed from the front side.

Recessed portions 46, 48 are formed around the first electromagnetic-valve-insertion hole 41 and the third electromagnetic-valve-insertion hole 43, and a projecting portion 47 is formed around the second electromagnetic-valve-insertion hole 42 on the front surface 40a of the intermediate wall part 40 as shown in FIG. 7.

The recessed portion 46 formed around the first electromagnetic-valve-insertion hole 41 is a portion formed by reducing the thickness of the wall on the front surface 40a side when the intermediate wall part 40 is formed.

Figure 8:
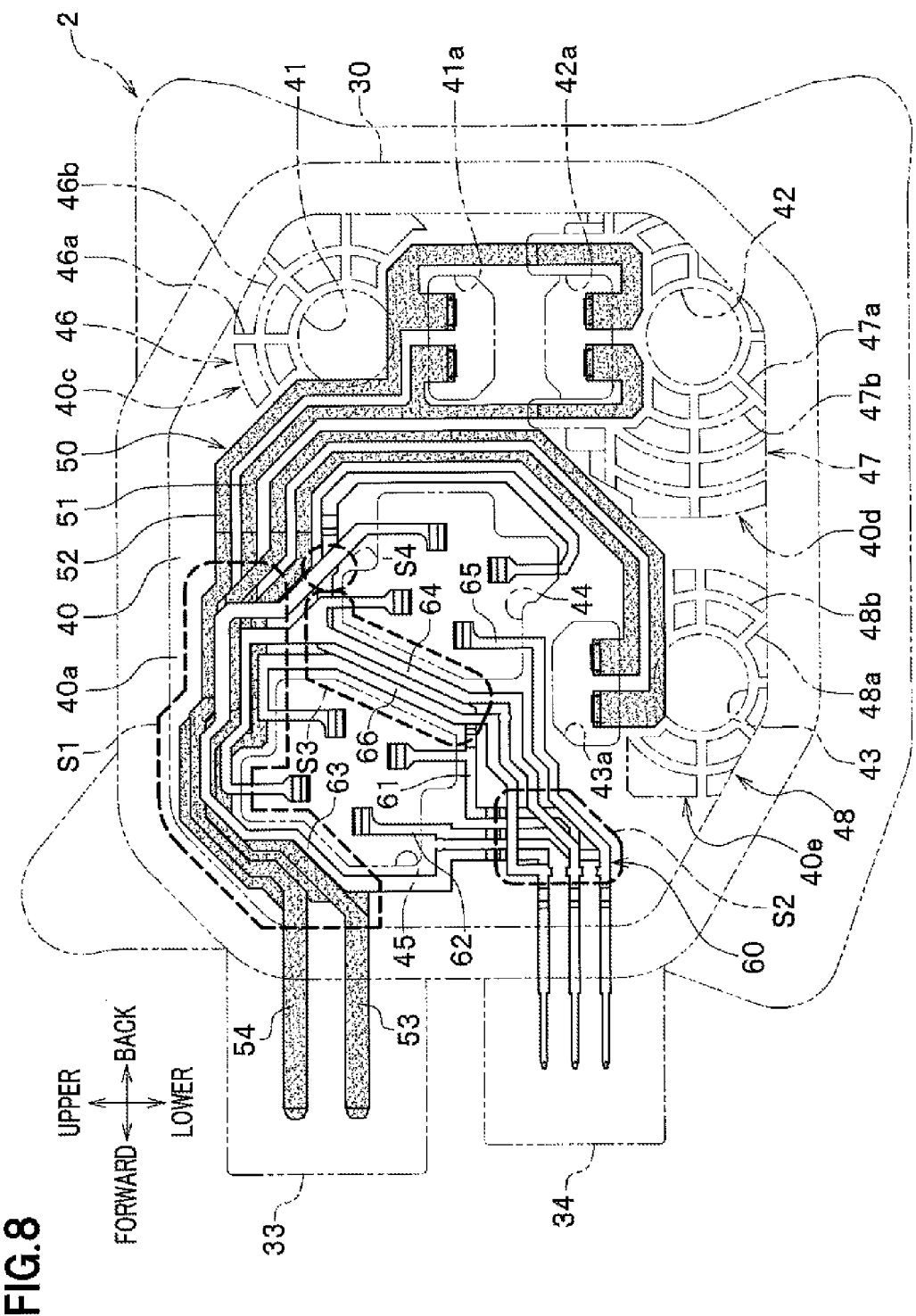
FIG. 8 is a side view showing a group of bus bars on the coil side and a group of bus bars on the sensor side of the present embodiment.
Figure 9:
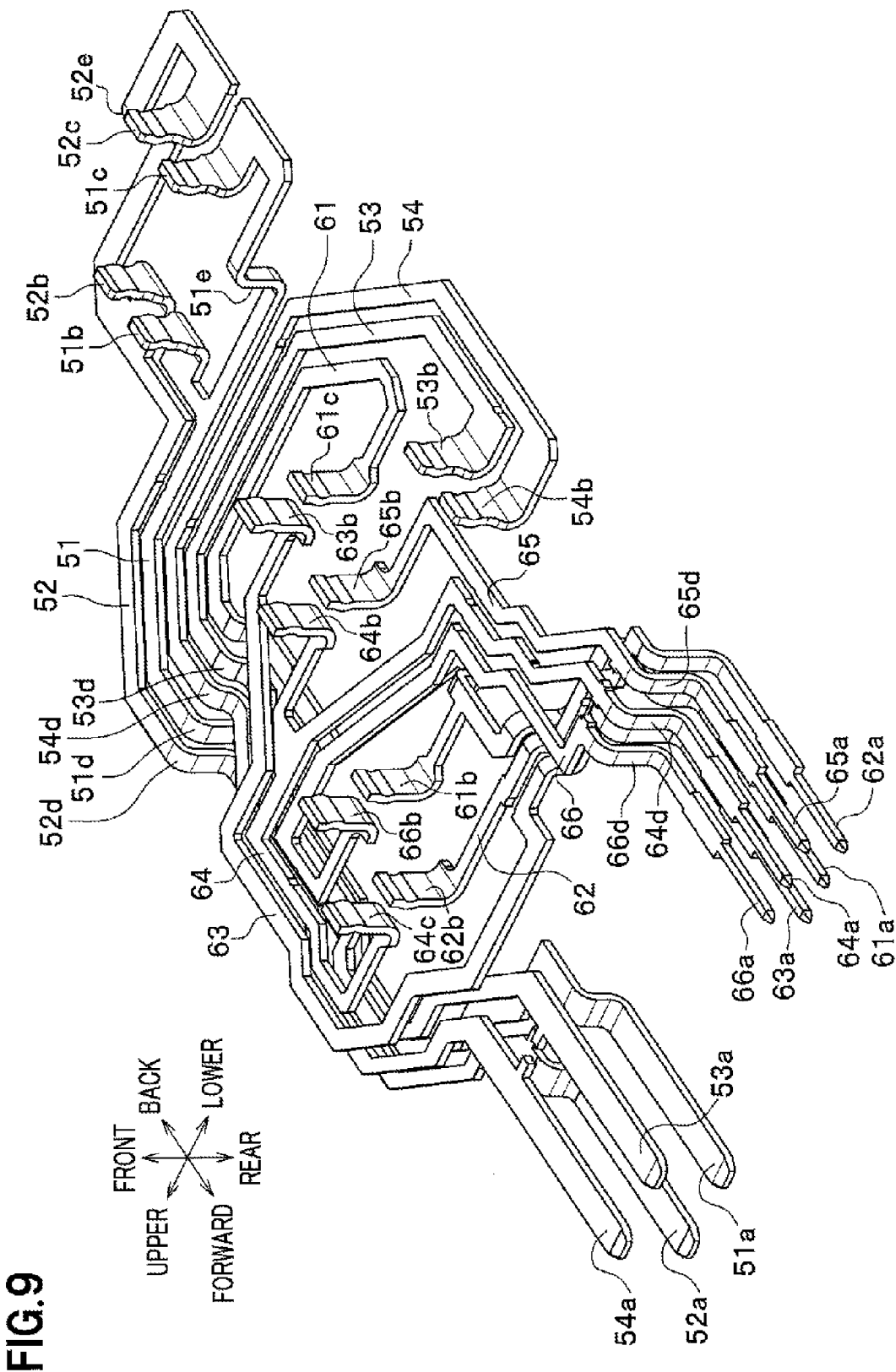
FIG. 9 is a perspective view showing the group of bus bars on the coil side and the group of bus bars on the sensor side of the present embodiment.

The recessed portion 46 is formed in a region adjacent to the peripheral wall part 30 (the region over and the region outside the back side of the first electromagnetic-valve-insertion hole 41) so as to avoid bus bars 51, 52 on the coil side embedded in the intermediate wall part 40 as shown in FIG. 8.

The recessed portion 46 is provided with a plurality of ribs 46a extending in radial directions starting from the hole wall of the first electromagnetic-valve-insertion hole 41 toward the outside of the first electromagnetic-valve-insertion hole 41, and a rib 46b formed along the circular direction of the first electromagnetic-valve-insertion hole 41 at an outside position apart from the hole wall of the first electromagnetic-valve-insertion hole 41 as shown in FIG. 7. And the recessed portion 46 is divided into a plurality of regions by intersecting of the ribs 46a and the rib 46b.

The recessed portion 48 formed around the third electromagnetic-valve-insertion hole 43 is a portion formed by reducing the thickness of the wall on the front surface 40a side when the intermediate wall part 40 is formed.

The recessed portion 48 is formed in a region adjacent to the peripheral wall part 30 (the region outside the forward side of, the region under, and the region outside the back side of the third electromagnetic-valve-insertion hole 43) so as to avoid bus bars 53, 54 on the coil side embedded in the intermediate wall part 40 as shown in FIG. 8.

The recessed portion 48 is provided with a plurality of ribs 48a extending in radial directions starting from the hole wall of the third electromagnetic-valve-insertion hole 43 toward the outside of the third electromagnetic-valve-insertion hole 43, and a rib 48*b* formed along the circular direction of the third electromagnetic-valve-insertion hole 43 at an outside position apart from the hole wall of the third electromagnetic-valve-insertion hole 43 as shown in FIG. 7. And the recessed portion 48 is divided into a plurality of regions by intersecting of the ribs 48*a* and the rib 48*b*.

The projecting portion 47 is formed of a plurality of ribs 47*a*, 47*b* projecting on the front surface 40*a* in the corner portion 40*d* on the back and lower side of the intermediate wall part 40. Furthermore, the corner portion 40*d* on the back and lower side is offset toward the front side than the other portions, so ribs 47*a*, 47*b* are formed by reducing the thickness of the peripheral portion outside the second electromagnetic-valve-insertion hole 42 when the intermediate wall part 40 is formed.

The projecting portion 47 is formed in a region adjacent to the peripheral wall part 30 (the region outside the forward side of, the region under, and the region outside the back side of the second electromagnetic-valve-insertion hole 42) so as to avoid bus bars 51, 52 on the coil side embedded in the intermediate wall part 40 as shown in FIG. 8.

The projecting portion 47 is provided with a plurality of ribs 47*a* extending in radial directions starting from the hole wall of the second electromagnetic-valve-insertion hole 42 toward the outside of the second electromagnetic-valve-insertion hole 42, and ribs 47*b* formed along the circular direction of the second electromagnetic-valve-insertion hole 42 at outside positions apart from the hole wall of the second electromagnetic-valve-insertion hole 42 as shown in FIG. 7. And the projecting portion 47 is divided into a plurality of regions by intersecting of the ribs 47*a* and the ribs 47*b*.

In the present embodiment, the group 50 of bus bars on the coil side and the group 60 of bus bars on the sensor side are embedded in the intermediate wall part 40 through molding as shown in FIG. 8.

In FIG. 8, dots are plotted on the group 50 of bus bars on the coil side to easily distinguish the group 50 of bus bars on the coil side from the group 60 of bus bars on the sensor side.

Figure 11:
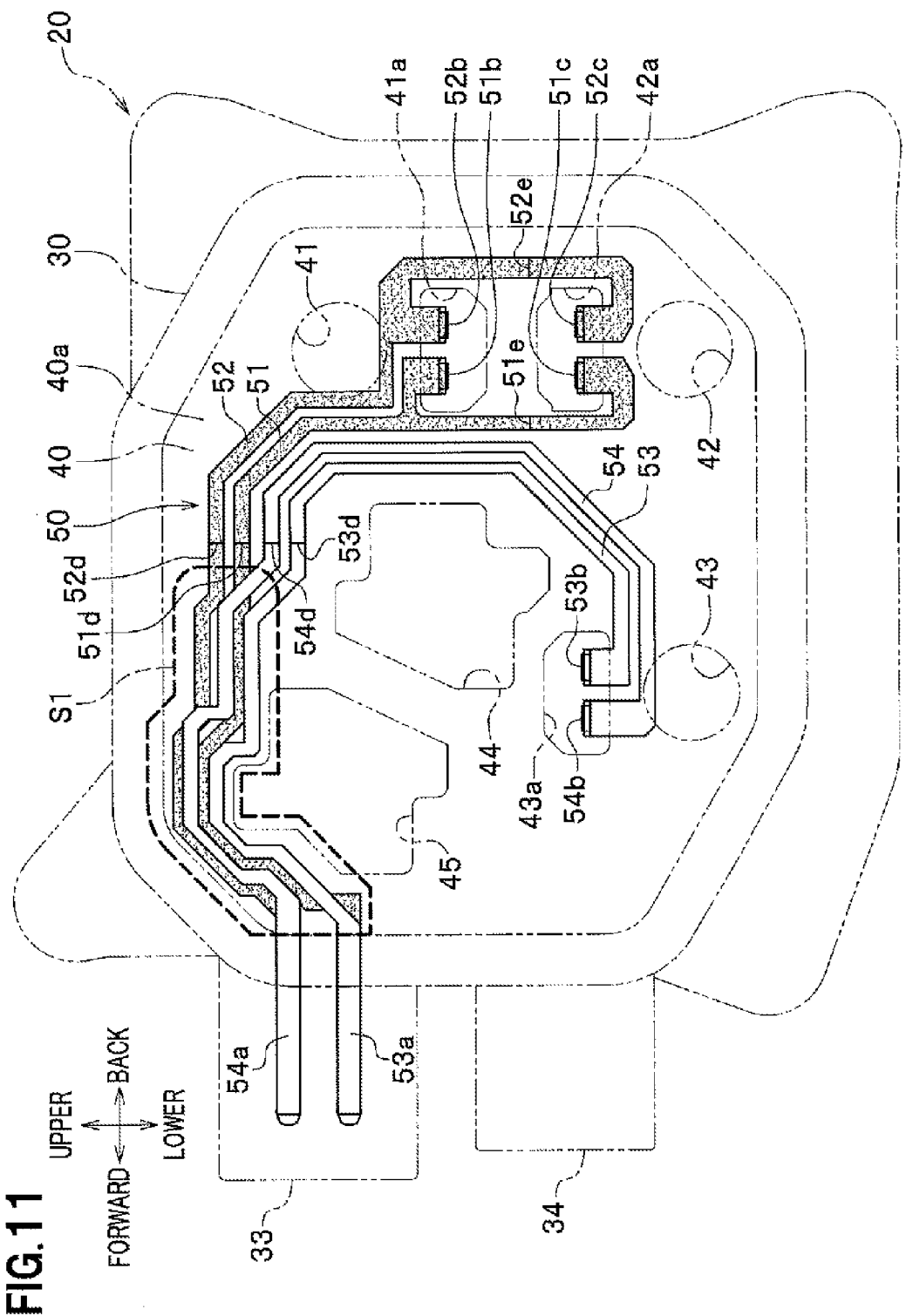
FIG. 11 is a side view showing the group of bus bars on the coil side of the present embodiment.

The group 50 of bus bars on the coil side is formed of four bus bars 51 to 54 on the coil side extending from the connector 33 on the coil side to the respective electromagnetic coils 4*b*, 5*b*, 6*b* (refer to FIG. 3) as shown in FIG. 11.

The respective bus bars 51 to 54 on the coil side are conductive members to supply currents to the respective electromagnetic coils 4*b*, 5*b*, 6*b* (refer to FIG. 3) from cables connected to the connector 33 on the coil side.

In FIG. 11, dots are plotted on the two bus bars 51, 52 on the coil side to easily distinguish the four bus bars 51 to 54 on the coil side.

Figure 10:
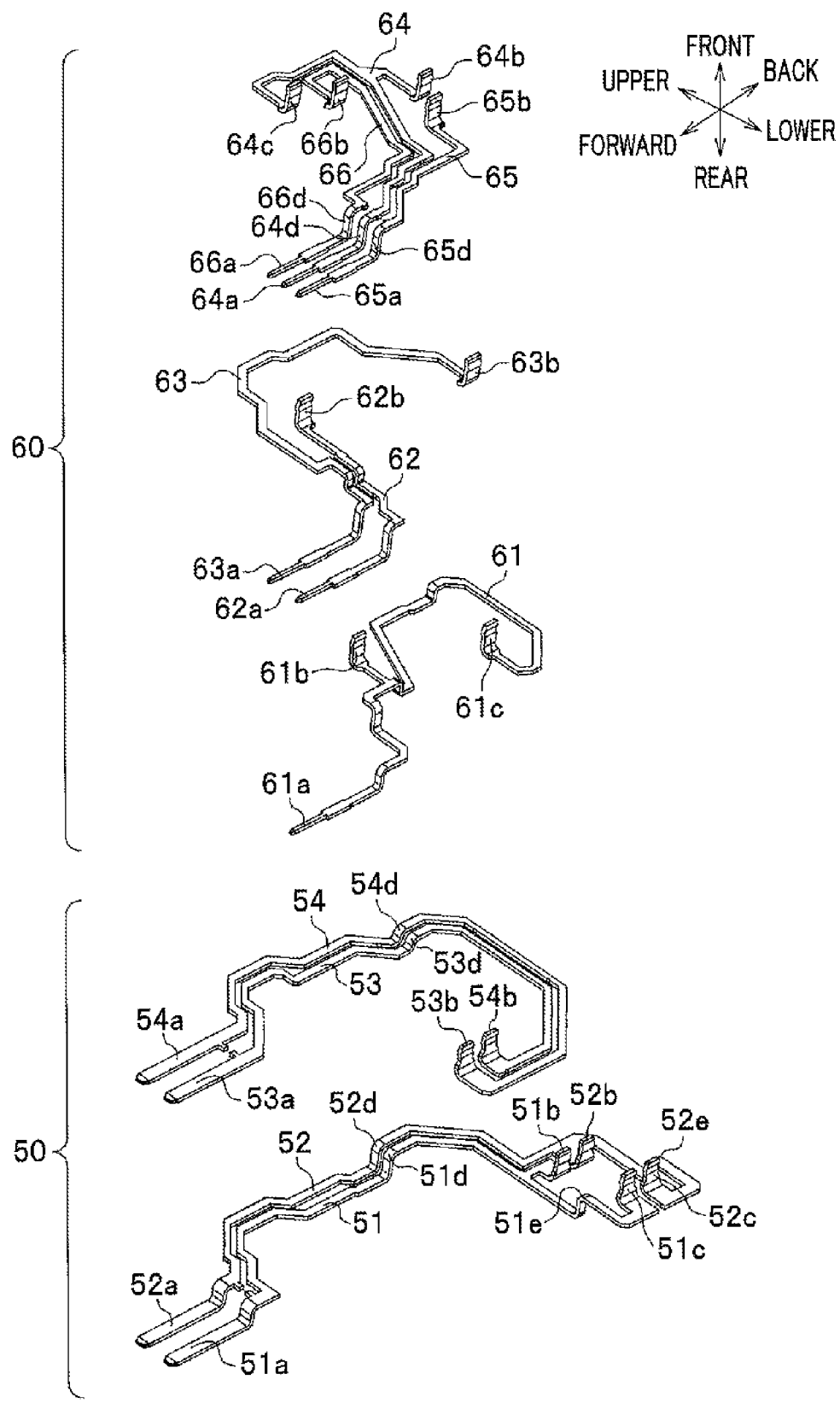
FIG. 10 is an exploded perspective view showing the group of bus bars on the coil side and the group of bus bars on the sensor side of the present embodiment.

The first bus bar 51 on the coil side is a conductive member on the cathode side. A terminal 51*a* on the connector side is formed at one end thereof, and terminals 51*b*, 51*c* on the coil side are formed at the other ends branched into two as shown in FIG. 10. The terminal 51*a* on the connector side projects in the connector 33 on the coil side as shown in FIG. 2B.

Furthermore, the terminal 51*a* on the connector side of the first bus bar 51 on the coil side does not appear in FIG. 11, because it is hidden on the rear side of a terminal 53*a* on the connector side of the third bus bar 53 on the coil side to be described later.

The first bus bar 51 on the coil side extends from the connector 33 on the coil side, through a region over the second opening 45 for sensor and a region between the first opening 44 for sensor and the first electromagnetic-valve-insertion hole 41, to regions outside the forward sides of the first opening 41*a* for coil and the second opening 42*a* for coil as shown in FIG. 11.

A terminal 51*b* on the coil side of the first bus bar 51 on the coil side projects in the forward and upper region of the first opening 41*a* for coil, and a terminal 51*c* on the coil side projects in the forward and lower region of the second opening 42*a* for coil.

The second bus bar 52 on the coil side is a conductive member on the anode side. A terminal 52*a* on the connector side is formed at one end thereof, and terminals 52*b*, 52*c* on the coil side are formed at the other ends branched into two as shown in FIG. 10. The terminal 52*a* on the connector side projects in the connector 33 on the coil side as shown in FIG. 2B, and is positioned over the upper side of the terminal 51*a* on the connector side.

Furthermore, the terminal 52*a* on the connector side of the second bus bar 52 on the coil side does not appear in FIG. 11, because it is hidden on the rear side of a terminal 54*a* on the connector side of the forth bus bar 54 on the coil side to be described later.

The second bus bar 52 on the coil side extends from the connector 33 on the coil side, through a region over the second opening 45 for sensor and a region between the first electromagnetic-valve-insertion hole 41 and the first opening 41*a* for coil, to the regions outside the back sides of the first opening 41*a* for coil and the second opening 42*a* for coil as shown in FIG. 11.

A terminal 52*b* on the coil side of the second bus bar 52 on the coil side projects in the back and upper region of the first opening 41*a* for coil, and a terminal 52*c* on the coil side projects in the back and lower region of the second opening 42*a* for coil.

The first bus bar 51 on the coil side and the second bus bar 52 on the coil side are formed of one metallic plate by punching, and are disposed schematically parallel to each other with a distance in the width direction. The first bus bar 51 on the coil side is disposed on the center side of the intermediate wall part 40, and the second bus bar 52 on the coil side is disposed on the side of the peripheral wall part 30.

The third bus bar 53 on the coil side is a conductive member on the anode side. A terminal 53*a* on the connector side is formed at one end of the third bus bar, and a terminal 53*b* on the coil side is formed at the other end as shown in FIG. 10. The terminal 53*a* on the connector side projects in the connector 33 on the coil side, and is positioned on the front side of the terminal 51*a* on the connector side as shown in FIG. 2B.

The third bus bar 53 on the coil side extends from the connector 33 on the coil side, through a region over the second opening 45 for sensor and a region between the first opening 44 for sensor and the first opening 41*a* for coil, to the region under the third opening 43*a* for coil as shown in FIG. 11.

The terminal 53*b* on the coil side of the third bus bar 53 on the coil side projects in the back and lower region of the third opening 43*a* for coil.

The forth bus bar 54 on the coil side is a conductive member on the cathode side. The terminal 54*a* on the connector side is formed at one end of the forth bus bar, and a terminal 54*b* on the coil side is formed at the other end as shown in FIG. 10. The terminal 54*a* on the connector side projects in the connector 33 on the coil side, and is positioned on the front side of the terminal 52*a* on the connector side as shown in FIG. 2B.

The fourth bus bar 54 on the coil side extends from the connector 33 on the coil side, through a region over the second opening 45 for sensor and a region between the first opening 44 for sensor and the first opening 41*a* for coil, to the region under the third opening 43*a* for coil as shown in FIG. 11.

The terminal 54*b* on the coil side of the fourth bus bar 54 on the coil side projects in the forward and lower region of the third opening 43*a* for coil.

The third bus bar 53 on the coil side and the fourth bus bar 54 on the coil side are formed of one metallic plate by punching, and are disposed schematically parallel to each other with a distance in the width direction. The third bus bar 53 on the coil side is disposed on the center side of the intermediate wall part 40, and the fourth bus bar 54 on the coil side is disposed on the side of the peripheral wall part 30.

There is provided a hierarchy region S1 on the coil side in a region over the second opening 45 for sensor of the intermediate wall part 40. In the hierarchy region S1 on the coil side, the third bus bar 53 on the coil side and the fourth bus bar 54 on the coil side are positioned over the front sides of the first bus bar 51 on the coil side and the second bus bar 52 on the coil side. That is, in the hierarchy region S1 on the coil side, the embedded positions of the first bus bar 51 on the coil side and the second bus bar 52 on the coil side are shifted in the thickness direction of the intermediate wall part 40 with reference to the embedded positions of the third bus bar 53 on the coil side and the fourth bus bar 54 on the coil side.

Furthermore, in the hierarchy region S1 on the coil side, the respective bus bars 51 to 54 on the coil side are positioned in a hierarchy state in the front-rear direction with one another while being shifted in the width direction of the intermediate wall part 40 with one another. That is, the respective bus bars 51 to 54 on the coil side are disposed so that the majorities of the first bus bar 51 on the coil side and the second bus bar 52 on the coil side can be seen when the hierarchy region S1 on the coil side is seen from the front side like FIG. 11.

Bent portions 51*d* to 54*d* bent toward the front side are formed in back portions of the respective bus bars 51 to 54 on the coil side positioned more posterior than the hierarchy region S1 on the coil side.

With regard to the respective bus bars 51 to 54 on the coil side, portions from the bent portions 51*d* to 54*d* to the respective terminals 51*b*, 52*b*, 53*b*, 54*b* on the coil side are disposed on a plane parallel to the front surface 40*a* of the intermediate wall part 40, and are juxtaposed with distances in the width direction of the intermediate wall part 40.

In the region between the first opening 44 for sensor and the first opening 41*a* for coil, the third bus bar 53 on the coil side and the fourth bus bar 54 on the coil side are disposed nearer the center of the intermediate wall part 40 than the first bus bar 51 on the coil side and the second bus bar 52 on the coil side.

With regard to the first bus bar 51 on the coil side and the second bus bar 52 on the coil side, bent portions 51*e*, 52*e* bent toward the front side are formed between the terminals 51*b*, 52*b* on the coil side and the terminals 51*c*, 51*b* on the coil side.

With regard to the first bus bar 51 on the coil side and the second bus bar 52 on the coil side, portions disposed around the second opening 42*a* for coil are shifted toward the front side with reference to portions disposed around the first opening 41*a* for coil, and are disposed on a plane parallel to the front surface 40*a*.

Furthermore, the respective terminals 51*b*, 51*c*, 52*b*, 52*c*, 53*b*, 54*b* on the coil side of the bus bars 51 to 54 on the coil side are bent toward the front side at right angles (refer to FIG. 7).

Figure 12:
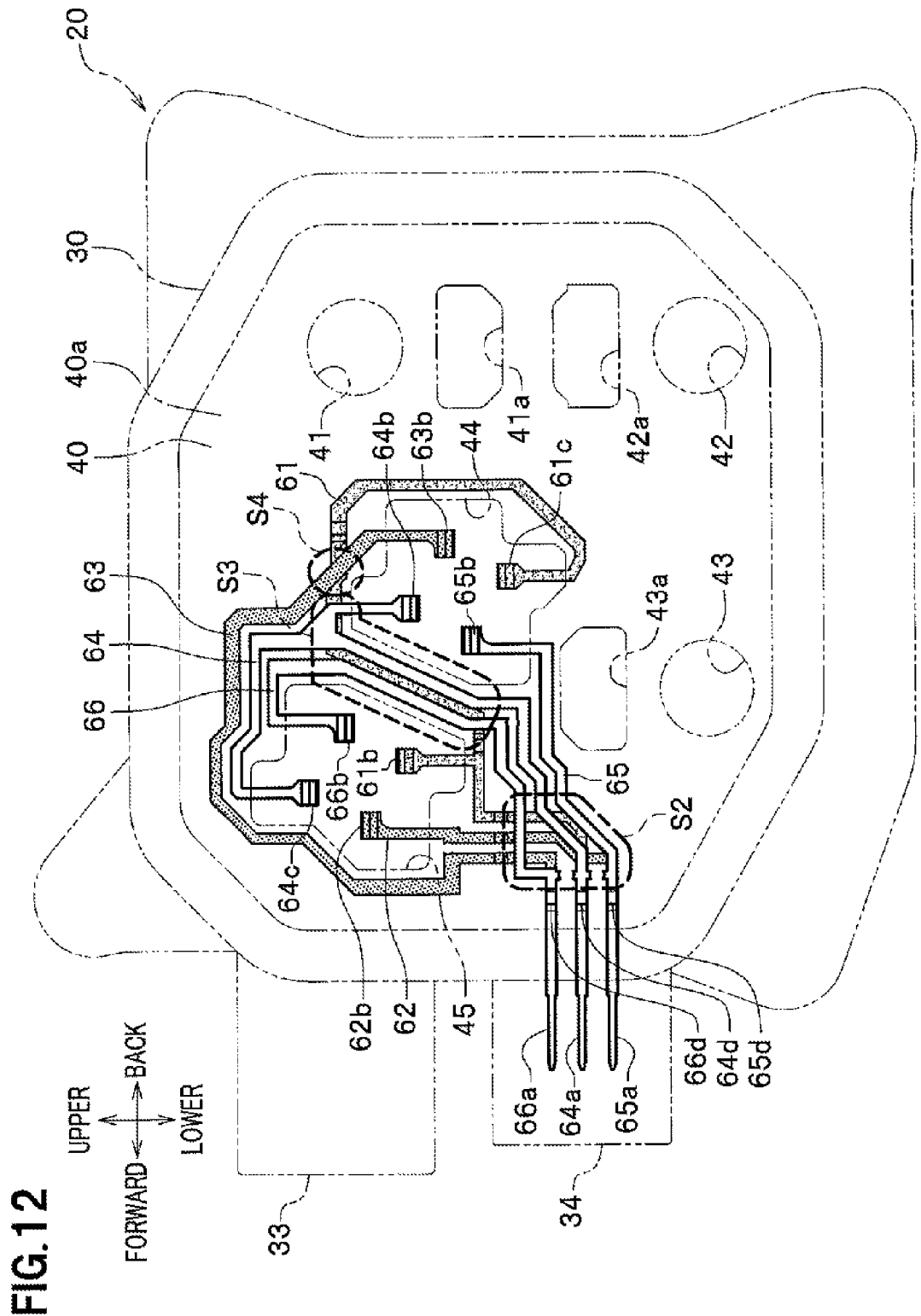
FIG. 12 is a side view showing the group of bus bars on the sensor side of the present embodiment.

The group 60 of bus bars on the sensor side is formed of six bus bars 61 to 66 on the sensor side extending from the connector 34 on the sensor side to the both pressure sensors 7, 8 (refer to FIG. 3) as shown in FIG. 12.

The respective bus bars 61 to 66 on the sensor side are conductive members to transfer detected signals output from the both pressure sensors 7, 8 to cables connected to the connector 34 on the sensor side.

Note that, in FIG. 12, dots are plotted on three bus bars 61, 62, 63 on the sensor side to easily distinguish the respective bus bars 61 to 66 on the sensor side.

The first bus bar 61 on the sensor side is the conductive member on the anode side. A terminal 61*a* on the connector side is formed at one end of the first bus bar, and terminals 61*b*, 61*c* on the sensor side are formed at an intermediate portion and the other end as shown in FIG. 10. The terminal 61*a* on the connector side projects in the connector 34 on the sensor side as shown in FIG. 2B.

Note that, in FIG. 12, the terminal 61*a* on the connector side of the first bus bar 61 on the sensor side does not appear because it is hidden on the rear side of a terminal 64*a* on the connector side of the fourth bus bar 64 on the sensor side to be described later.

The first bus bar 61 on the sensor side extends from the connector 34 on the sensor side, through a region between the first opening 44 for sensor and the second opening 45 for sensor and the region between the first opening 44 for sensor and the first opening 41*a* for coil to the region under the first opening 44 for sensor as shown in FIG. 12.

The terminal 61*b* on the sensor side of the first bus bar 61 on the sensor side projects in the back and lower region of the second opening 45 for sensor, and the terminal 61*c* on the sensor side projects in the back and lower region of the second opening 45 for sensor.

The second bus bar 62 on the sensor side is a conductive member to transfer a detected signal output from the pressure sensor 7, and a terminal 62*a* on the connector side is formed at one end of the second bus bar, and a terminal 62*b* on the sensor side is formed at the other end as shown in FIG. 10. The terminal 62*a* on the connector side projects in the lower connector 34 and is disposed under the terminal 61*a* on the connector side as shown in FIG. 2B.

Note that, in FIG. 12, the terminal 62*a* on the connector side of the second bus bar 62 on the sensor side does not appear because it is hidden on the rear side of a terminal 65*a* on the connector side of a fifth bus bar 65 on the sensor side to be described later.

The second bus bar 62 on the sensor side extends from the connector 34 on the sensor side to the region under the second opening 45 for sensor, and the terminal 62*b* on the sensor side projects in the forward and lower region of the second opening 45 for sensor as shown in FIG. 12.

The third bus bar 63 on the sensor side is a conductive member to transfer a detected signal output from the pressure sensors 8, and a terminal 63*a* on the connector side is formed at one end of the third bus bar, and a terminal 63*b* on the sensor side is formed at the other end as shown in FIG. 10. The terminal 63*a* on the connector side projects in the connector 34 on the sensor side and is disposed over the terminal 61*a* on the connector side as shown in FIG. 2B.

Note that, in FIG. 12, the terminal 63*a* on the connector side of the third bus bar 63 on the sensor side does not appear because it is hidden on the rear side of a terminal 66*a* on the connector side of a sixth bus bar 66 on the sensor side to be described later.

The third bus bar 63 on the sensor side extends from the connector 34 on the sensor side, through regions outside the forward side of and over the second opening 45 for sensor, to the region over the first opening 44 for sensor, and the terminal 63*b* on the sensor side projects in the forward and upper region of the first opening 44 for sensor as shown in FIG. 12.

The second bus bar 62 on the sensor side and the third bus bar 63 on the sensor side are formed of one metallic plate by punching. The second bus bar 62 on the sensor side is disposed on the center side of the intermediate wall part 40, and the third bus bar 63 on the sensor side is disposed on the side of the peripheral wall part 30.

The fourth bus bar 64 on the sensor side is a conductive member on the cathode side. A terminal 64*a* on the connector side is formed at one end of the fourth bus bar, and terminals 64*b*, 64*c* on the sensor side are formed at an intermediate portion and the other end as shown in FIG. 10. The terminal 64*a* on the connector side projects in the connector 34 on the sensor side, and is disposed on the front side of the terminal 61*a* on the connector side as shown in FIG. 2B.

The fourth bus bar 64 on the sensor side extends from the connector 34 on the sensor side, through the region between the first opening 44 for sensor and the second opening 45 for sensor, to branch out into two, and extends to regions over the first opening 44 for sensor and the second opening 45 for sensor as shown in FIG. 12. The terminal 64*b* on the sensor side projects in the forward and upper region of the first opening 44 for sensor, and the terminal 64*c* on the sensor side projects in the forward and upper region of the second opening 45 for sensor.

The fifth bus bar 65 on the sensor side is a conductive member to transfer a detected signal output from the second pressure sensor 8, and a terminal 65*a* on the connector side is formed at one end of the fifth bus bar, and a terminal 65*b* on the sensor side is formed at the other end as shown in FIG. 10. The terminal 65*a* on the connector side projects in the connector 34 on the sensor side and is disposed on the front side of the terminal 62*a* on the connector side as shown in FIG. 2B.

The fifth bus bar 65 on the sensor side extends from the connector 34 on the sensor, through the region between the second opening 45 for sensor and the third opening 43*a* for coil, to the region under the first opening 44 for sensor as shown in FIG. 12. The terminal 65*b* on the sensor side projects in the forward and lower region of the first opening 44 for sensor.

The sixth bus bar 66 on the sensor side is a conductive member to transfer a detected signal output from the first pressure sensor 7, and a terminal 66*a* on the connector side is formed at one end of the sixth bus bar, and a terminal 66*b* on the sensor side is formed at the other end as shown in FIG. 10. The terminal 66*a* on the connector side projects in the connector 34 on the sensor side and is disposed on the front side of the terminal 63*a* on the connector side as shown in FIG. 2B.

The sixth bus bar 66 on the sensor side extends from the connector 34 on the sensor side, through the region between the first opening 44 for sensor and the second opening 45 for sensor, to the region over the second opening 45 for sensor, and the terminal 66*b* on the sensor side projects in the back and upper region of the second opening 45 for sensor as shown in FIG. 12.

The fourth bus bar 64 on the sensor side, the fifth bus bar 65 on the sensor side and the sixth bus bar 66 on the sensor side are formed of one metallic plate by punching, and are disposed in the width direction with distances. The sixth bus bar 66 on the sensor side is disposed above the upper side of the fourth bus bar 64 on the sensor side, and the fifth bus bar 65 on the sensor side is disposed below the lower side of the fourth bus bar 64 on the sensor side.

In the region over the second opening 45 for sensor of the intermediate wall part 40, three bus bars 63, 64, 66 on the sensor side are positioned over the front side of the hierarchy region S1 on the coil side where the respective bus bars 51 to 54 on the coil side are positioned in a hierarchy state with one another, as shown in FIG. 8.

And there is provided a hierarchy region S2 on the sensor side in a region near the connector 34 on the sensor side as shown in FIG. 12. In the hierarchy region S2 on the sensor side, the second bus bar 62 on the sensor side is positioned over the front side of the first bus bar 61 on the sensor side, and moreover, the fourth bus bar 64 on the sensor side, the fifth bus bar 65 on the sensor side and the sixth bus bar 66 on the sensor side are positioned over the front sides of the second bus bar 62 on the sensor side and the third bus bar 63 on the sensor side. That is, in the hierarchy region S2 on the sensor side, the embedded position of the first bus bar 61 on the sensor side, the embedded positions of the second bus bar 62 on the sensor side and the third bus bar 63 on the sensor side, and the embedded positions of the fourth bus bar 64 on the sensor side, the fifth bus bar 65 on the sensor side and the sixth bus bar 66 on the sensor side, are shifted in the thickness direction of the intermediate wall part 40.

Furthermore, there is provided a hierarchy region S3 on the sensor side in the region between the first opening 44 for sensor and the second opening 45 for sensor of the intermediate wall part 40. In the hierarchy region S3 on the sensor side, the fourth bus bar 64 on the sensor side and the sixth bus bar 66 on the sensor side are positioned above the front side of the first bus bar 61 on the sensor side. That is, in the hierarchy region S3 on the sensor side, the embedded position of the first bus bar 61 on the sensor side is shifted in the thickness direction of the intermediate wall part 40 with reference to the embedded positions of the fourth bus bar 64 on the sensor side and the sixth bus bar 66 on the sensor side.

Furthermore, there is provided a hierarchy region S4 on the sensor side in the region over the upper side of the first opening 44 for sensor of the intermediate wall part 40. In the hierarchy region S4 on the sensor side, the third bus bar 63 on the sensor side is positioned over the front side of the first bus bar 61 on the sensor side. That is, in the hierarchy region S4 on the sensor side, the embedded position of the first bus bar 61 on the sensor side is shifted in the thickness direction of the intermediate wall part 40 with reference to the embedded position of the third bus bar 63 on the sensor side.

Moreover, in each hierarchy region S2, S3, S4 on the sensor side, the respective bus bars 61 to 66 on the sensor side are positioned in a hierarchy state with one another in the front-rear direction of the intermediate wall part while being shifted in the width direction of the intermediate wall part 40. That is, the respective bus bars 61 to 66 on the sensor side are disposed so that the majority area of each of the bus bars 61 to 66 on the sensor side can be seen when the hierarchy regions S2, S3, S4 on the sensor side are seen from the front side like FIG. 12.

Furthermore, with regard to the fourth bus bar 64 on the sensor side, the fifth bus bar 65 on the sensor side and the sixth bus bar 66 on the sensor side, bended portions 64*d* to 66d bended toward the front side are formed at positions between the terminals 64a to 66a on the connector side and the hierarchy region S2 on the sensor side, respectively.

With regard to the fourth bus bar 64 on the sensor side, the fifth bus bar 65 on the sensor side and the sixth bus bar 66 on the sensor side, portions from the bended portions 64d to 66d over to the respective terminals 64b, 64c, 65b, 66b on the sensor side are disposed on a plane parallel to the front surface 40a of the intermediate wall part 40, and juxtaposed in the width direction of the intermediate wall part 40 with one another.

Furthermore, with regard to the first bus bar 61 on the sensor side, the second bus bar 62 on the sensor side and the third bus bar 63 on the sensor side, a plurality of bended portions are formed so that the respective terminals 61b, 61c, 62b, 63b on the sensor side are disposed on the same plane that the terminals 64b, 64c, 65b, 66b on the sensor side of the fourth bus bar 64 on the sensor side, of the fifth bus bar 65 on the sensor side and of the sixth bus bar 66 on the sensor side are disposed on, respectively.

Furthermore, as shown in FIG. 8, the hierarchy region S1 on the coil side where the respective bus bars 51 to 54 on the coil side are positioned in a hierarchy state with one another in the front-rear direction and the hierarchy regions S2, S3, S4 on the sensor side where the respective bus bars 61 to 66 on the sensor side are positioned in a hierarchy state with one another in the front-rear direction, are disposed so as to be shifted from one another in the width direction of the intermediate wall part 40. That is, as shown in FIG. 8, the respective hierarchy regions S1 to S4 are disposed so that those S1 to S4 can be seen when the group 50 of bus bars on the coil side and the group 60 of bus bars on the sensor side are viewed from the front side.

Furthermore, the respective terminals 61b, 61c, 62b, 63b, 64b, 64c, 65b, 66b on the sensor side of the bus bars 61 to 66 on the sensor side are bended toward the front side at right angles (refer to FIG. 7).

Furthermore, the current value to flow in the respective bus bars 61 to 66 on the sensor side is smaller than the current value to flow in the respective bus bars 51 to 54 on the coil side. So, the widths of the terminals 61a to 66a on the connector side of the bus bars 61 to 66 on the sensor side are formed smaller than those of the terminals 51a to 54a on the connector side of the bus bars 51 to 54 on the coil side.

As mentioned above, since the respective hierarchy regions S1 to S4 are disposed in the intermediate wall part 40, a plurality of bus bars can be formed in the narrow region between the upper edge portion of the second opening 45 for sensor and the peripheral wall part 30, and in the narrow region between the first opening 44 for sensor and the second opening 45 for sensor.

Note that, when the intermediate wall part 40 is formed, the respective bus bars 51 to 54 on the coil side and the respective bus bars 61 to 66 on the sensor side are assembled in the above-mentioned hierarchy state with use of spacers made of resin, the respective bus bars 51 to 54 on the coil side and the respective bus bars 61 to 66 on the sensor side can be molded in the intermediate wall part 40 together with the spacers.

As shown in FIG. 3, the two connection terminals 4c provided to the electromagnetic coil 4b of the first shutoff valve 4 are inserted in the first opening 41a for coil, and the terminals 4c are electrically connected to the terminals 51b, 52b on the coil side by means of welding or the like.

The two connection terminals 5c provided to the electromagnetic coil 5b of the second shutoff valve 5 are inserted in the second opening 42a for coil, and the terminals 5c are electrically connected to the terminals 51c, 52c on the coil side by means of welding or the like.

The two connection terminals 6c provided to the electromagnetic coil 6b of the third shutoff valve 6 are inserted in the third opening 43a for coil, and the terminals 6c are electrically connected to the terminals 53b, 54b on the coil side by means of welding or the like.

As shown in FIG. 5, elastic members 70 are disposed between the rear surface 40b of the intermediate wall part 40 and front surfaces of the electromagnetic coils 4b, 5b, 6b. The elastic members 70 are plate springs having the shapes of V in the side view, and for absorbing vibrations of the electromagnetic coils 4b, 5b, 6b as well as pushing the electromagnetic coils 4b, 5b, 6b onto the base body 10.

As shown in FIG. 3, the four connection terminals 8a equipped on the second pressure sensor 8 are inserted into the first opening 44 for sensor, and electrically connected to the terminals 61c, 63b, 64b, 65b on the sensor side by means of welding or the like.

The four connection terminals 7a equipped on the first pressure sensor 7 are inserted into the second opening 45 for sensor, and electrically connected to the terminals 61b, 62b, 64c, 66b on the sensor side by means of welding or the like.

In the master cylinder unit A1 described above, as shown in FIG. 8, since the hierarchy region S1 on the coil side in which the respective bus bars 51 to 54 on the coil side are positioned in a hierarchy state with one another in the front-rear direction, and the hierarchy regions S2 to S4 on the sensor side in which the respective bus bars 61 to 66 on the sensor side are positioned in a hierarchy state with one another in the front-rear direction, are disposed in the intermediate wall part 40, the respective bus bars are gathered densely. Furthermore, since there exists the region in which the group 50 of bus bars on the coil side and the group 60 of bus bars on the sensor side are positioned in a hierarchy state with each other in the front-rear direction in the intermediate wall part 40, different kinds of bus bars 51 to 54, and 61 to 66 are gathered densely.

Accordingly, in the housing 20, the space to accommodate the bus bars 51 to 54, 61 to 66 can be reduced, and the flexibility to dispose them 51 to 54, 61 to 66 can be enhanced, so that the housing 20 can be formed to be compact and light.

Note that, since the space to accommodate the bus bars 51 to 54, 61 to 66 is small, and the flexibility to dispose them 51 to 54, 61 to 66 is high, the space to dispose the bus bars 51 to 54, 61 to 66 can be secured in the housing 20 also in the case where the three shutoff valves 4, 5, 6 and the two pressure sensors 7, 8 are disposed compactly in the housing 20.

Furthermore, since the hierarchy region S1 on the coil side and the hierarchy regions S2, S3, S4 on the sensor side are disposed so as to be shifted from one another in the width direction of the intermediate wall part 40, the hierarchy regions of the bus bars 51 to 54, 61 to 66 can be prevented from being thick in the front-rear direction.

Furthermore, as shown in FIG. 6, the three shutoff valves 4, 5, 6 are disposed so that the isosceles triangle is formed of the line segments L1, L2, L3 connecting the axis positions of the three electromagnetic valves 4a, 5a, 6a on the front surface 40a of the intermediate wall part 40, thereby, the three shutoff valves 4, 5, 6 can be accommodated compactly in the housing 20.

Specifically, in the present embodiment, since the shutoff valves 4, 5, 6 are disposed in three corner portions of the four corner portions of the peripheral wall part 30, the space in the housing 20 is efficiently used.

Note that, the second pressure sensor 8 is positioned on the line L4 which divides the apex angle P1 of the isosceles triangle formed of the line segments L1, L2, L3 into two equal angles. Furthermore, on the front surface 40a of the intermediate wall part 40, the second pressure sensor 8 is positioned within the region formed of the line segments L1, L2, L5, L6 connecting the axis positions of the three electromagnetic valves 4a, 5a, 6a and the axis position of the first pressure sensor 7, and outside the region of the isosceles triangle surrounded by the line segments L1, L2, L3. Thereby, the three shutoff valves 4, 5, 6 and the two pressure sensors 7, 8 can be disposed compactly and in a well-balanced state in the housing 20.

Furthermore, as shown in FIGS. 11 and 12, in the hierarchy regions S1 to S4, the respective bus bars 51 to 54 on the coil side and the respective bus bars 61 to 66 on the sensor side are positioned in a hierarchy state with one another in the front-rear direction while being shifted from one another in the width direction of the intermediate wall part 40. Therefore, the respective bus bars 51 to 54, 61 to 66 can be held in the front-rear direction with holding pins or the like even in the regions where the respective bus bars 51 to 54, 61 to 66 are positioned in a hierarchy state with one another. Accordingly, the respective bus bars 51 to 54, 61 to 66 can be precisely positioned when the intermediate wall part 40 is molded.

The flexibility of laying out the hydraulic pressure paths to be formed in the base body 10 can be enhanced by attaching the shutoff valves 4, 5, 6 (refer to FIG. 3) to the intermediate wall part 40 in the state of shifting the respective shutoff valves 4, 5, 6 in the front-rear direction as shown in FIG. 5.

Furthermore, since the recessed portions 46, 48 and the projecting portion 47 are formed on the front surface 40a of the intermediate wall part 40 as shown in FIG. 7 so that a surface area of the intermediate wall part 40 becomes large, the ability to dissipate the heat of the intermediate wall part 40 can be enhanced. And the strength of the intermediate wall part 40 can be increased while the thickness of the intermediate wall part 40 being kept not to become thick by forming the recessed portions 46, 48 and the projecting portion 47 on the intermediate wall part 40. Therefore, decrease of the strength of the housing 20 due to heat can be prevented.

Furthermore, since the recessed portions 46, 48 and the projecting portion 47 are formed on the front surface 40a of the intermediate wall part 40, the elastic members 70 can be steadily received on the rear surface 40b of the intermediate wall part 40 (refer to FIG. 5), and decrease of the strength of the intermediate wall part 40 due to the pressing forces of the elastic members 70 can be prevented.

Furthermore, the projecting portion 47 is constituted by the ribs 47a formed to extend in radial directions, and there are provided the ribs 48a disposed to extend in radial directions in the recessed portions 46, 48, so that the pressing forces of the elastic members 70 acted on the intermediate wall part 40 can be effectively dispersed.

Furthermore, since the recessed portions 46, 48 are formed so as to avoid the bus bars 51 to 54, 61 to 66 embedded in the intermediate wall part 40, the thickness of the intermediate wall part 40 can be kept not to become thick.

Furthermore, since the intermediate wall part 40, the recessed portions 46, 48, and the projecting portion 47 are formed of resin material, the recessed portions 46, 48 and the projecting portion 47 can be molded integrally with the intermediate wall part 40.

The present embodiment has been described above, but the present invention is not limited to that embodiment and may be properly modified without departing from the purpose of the present invention.

For example, the number and/or the positions of the bus bars 51 to 54 on the coil side and the bus bars 61 to 66 on the sensor side shown in FIG. 8 are not limited to them, and can be properly set in accordance with the number and/or the positions of electric parts in the housing 20.

Furthermore, in the present embodiment, the three shutoff valves 4, 5, 6 and the two pressure sensors 7, 8 are accommodated in the housing 20, but the number and/or the positions are not limited to them. And electric parts to be accommodated in the housing 20 are not limited to shutoff valves and pressure sensors. For example, a substrate for controlling electric parts may be accommodated in the housing 20.

Furthermore, in the present embodiment, both of the hierarchy region S1 on the coil side and the hierarchy regions S2 to S4 on the sensor side are provided, but only either of the hierarchy region S1 on the coil side and the hierarchy regions S2 to S4 on the sensor side may be provided. Additionally, neither the hierarchy region S1 on the coil side nor the hierarchy regions S2 to S4 on the sensor side may be provided.

Furthermore, in the present embodiment, both of the recessed portions 46, 48 and the projecting portion 47 are formed on the front surface 40a of the intermediate wall part 40, but it is all right that at least either of the recessed portions and the projecting portion is formed in accordance with the strength and/or the ability to dissipate the heat of the intermediate wall part 40. Additionally, the configurations and/or the positions of the recessed portions and the projecting portion are not limited. And the recessed portions and the projecting portion may be formed on the rear surface of the intermediate wall part 40.

Furthermore, in the present embodiment, the recessed portions 46, 47 and the projecting portion 47 of the intermediate wall part 40 are formed of resin material and integrally with the intermediate wall part 40, but the recessed portions and the projecting portion may be formed of metallic material, and may be molded with the intermediate wall part 40.

Furthermore, in the present embodiment, the case where the brake hydraulic device for a vehicle of the present invention is applied to the master cylinder unit A1 of the vehicle-brake system A is explained as an example, but a device or unit which the brake hydraulic device for a vehicle of the present invention can be applied to is not limited, and it can be also applied to a hydraulic pressure control unit to carry out an ABS control, a skid control, a traction control, or the like.

DESCRIPTION OF THE SYMBOLS

1 Master cylinder
2 Stroke simulator
3 Reservoir
4 First shutoff valve
4a Electromagnetic valve
4b Electromagnetic coil
5 Second shutoff valve
5a Electromagnetic valve
5b Electromagnetic coil
6 Third shutoff valve
6a Electromagnetic valve
6b Electromagnetic coil 7 First pressure sensor
8 Second pressure sensor
10 Base body
20 Housing
30 Peripheral wall part
33 Connector on the coil side
34 Connector on the sensor side
35 Housing chamber
40 Intermediate wall part
41 First electromagnetic-valve-insertion hole
41a First opening for coil
42 Second electromagnetic-valve-insertion hole
42a Second opening for coil
43 Third electromagnetic-valve-insertion hole
43a Third opening for coil
44 First opening for sensor
45 Second opening for sensor
46 Recessed portion
46a, 46b Rib
47 Projecting portion
47a, 47b Rib
48 Recessed portion
48a, 48b Rib
50 Group of bus bars on the coil side
51 First bus bar on the coil side
51a Terminal on the connector side
51b, 51c Terminal on the coil side
52 Second bus bar on the coil side
52a Terminal on the connector side
52b, 52c Terminal on the coil side
53 Third bus bar on the coil side
53a Terminal on the connector side
53b Terminal on the coil side
54 Fourth bus bar on the coil side
54a Terminal on the connector side
54b Terminal on the coil side
60 Group of bus bars on the sensor side
61 First bus bar on the sensor side
61a Terminal on the connector side
61b, 61c Terminal on the sensor side
62 Second bus bar on the sensor side
62a Terminal on the connector side
62b Terminal on the sensor side
63 Third bus bar on the sensor side
63a Terminal on the connector side
63b Terminal on the sensor side
64 Fourth bus bar on the sensor side
64a Terminal on the connector side
64b, 64c Terminal on the sensor side
65 Fifth bus bar on the sensor side
65a Terminal on the connector side
65b Terminal on the sensor side
66 Sixth bus bar on the sensor side
66a Terminal on the connector side
66b Terminal on the sensor side
70 Elastic member
A Vehicle-brake system
A1 Master cylinder unit
A2 Motor cylinder unit
A3 Hydraulic pressure control unit
S1 Hierarchy region on the coil side
S2, S3, S4 Hierarchy region on the sensor side

The invention claimed is:
1. A brake hydraulic device for a vehicle, comprising:
a base body having a hydraulic pressure path for brake fluid formed therein;
three electromagnetic valves which open and close the hydraulic pressure path;
three electromagnetic coils which drive the electromagnetic valve;
two pressure sensors which detect intensity of the hydraulic pressure of the brake fluid in the hydraulic pressure path; and
a housing attached to an outer surface of the base body and having a housing chamber for accommodating the electromagnetic valve, the electromagnetic coil, and the pressure sensors,
wherein the housing includes a peripheral wall part having openings formed on a front side and a rear side thereof, and an intermediate wall part partitioning a space inside the peripheral wall part into a front side and a rear side,
wherein the housing chamber is provided in the rear side,
wherein a set of coil side bus bars electrically connected to the electromagnetic coil, and a set of sensor side bus bars electrically connected to the pressure sensors are embedded in the intermediate wall part, and
wherein a stacked region is provided in which the set of coil side bus bars and the set of sensor side bus bars are positioned in a stacked state with each other in a front-rear direction,
wherein an isosceles triangle is formed of line segments each of which connects the axis positions of the three electromagnetic valves on a wall surface of the intermediate wall part, and
wherein one of the two pressure sensors is positioned inside a quadrangle formed of line segments each of which connects the axis positions of the three electromagnetic valves and an axis position of the other of the two pressure sensors on the wall surface of the intermediate wall part.

2. The brake hydraulic device for a vehicle according to claim 1,
wherein the stacked region includes a coil side stacked region in which the respective coil side bus bars are positioned in a stacked state in the front-rear direction, and a sensor side stacked region in which the respective sensor side bus bars are positioned in a stacked state in the front-rear direction, and
wherein at least one of the coil side staked region and the sensor side stacked region is provided in the intermediate wall part.

3. The brake hydraulic device for a vehicle according to claim 1,
wherein the stacked region is provided in the intermediate part and includes a coil side stacked region in which the respective coil side bus bars are positioned in a stacked state in the front-rear direction, and a sensor side stacked region in which the respective sensor side bus bars are positioned in a stacked state in the front-rear direction, and
wherein the coil side stacked and the sensor side stacked region are shifted from each other in a width direction of the intermediate wall part.

4. The brake hydraulic device for a vehicle according to claim 2, wherein the coil side stacked region and the sensor side stacked region are shifted from each other in a width direction of the intermediate wall part.

5. The brake hydraulic device for a vehicle according to claim 1, wherein one of the pressure sensors is positioned on a line to divide the apex angle of the isosceles triangle formed of the line segments each of which connects the axis positions of the three electromagnetic valves, into two equal angles.

6. The brake hydraulic device for a vehicle according to claim 1, wherein two of the pressure sensors are positioned outside the region surrounded by the line segments each of which connects the axis positions of the three electromagnetic valves on the wall surface of the intermediate wall part.

7. The brake hydraulic device for a vehicle according to claim 1, wherein at least one electromagnetic valve of the three electromagnetic valves is attached to the intermediate wall part while being shifted from the other electromagnetic valves in the front-rear direction.

8. The brake hydraulic device for a vehicle according to claim 3, wherein the coil side stacked region and the sensor side stacked region are shifted from each other in a width direction of the intermediate wall part.

9. The brake hydraulic device for a vehicle according to claim 5, wherein the two pressure sensors are positioned outside the region surrounded by the line segments each of which connects the axis positions of the three electromagnetic valves on the wall surface of the intermediate wall part.

10. The brake hydraulic device for a vehicle according to claim 5, wherein at least one electromagnetic valve of the three electromagnetic valves is attached to the intermediate wall part while being shifted from the other electromagnetic valves in the front-rear direction.

\* \* \* \* \*